US012561615B2

(12) United States Patent
Shaver et al.

(10) Patent No.: US 12,561,615 B2
(45) Date of Patent: Feb. 24, 2026

(54) SYSTEM AND METHOD FOR PROBABILISTIC DECISION-MAKING UNDER UNCERTAINTY IN AUTONOMOUS CYBER OPERATIONS

(71) Applicant: CYNNOVATIVE, LLC, Arlington, VA (US)

(72) Inventors: Benjamin P. Shaver, Arlington, VA (US); Michael G. Beck, Arlington, VA (US); Jim A. Simpson, Arlington, VA (US)

(73) Assignee: CYNNOVATIVE, LLC, Arlington, VA (US)

( * ) Notice: Subject to any disclaimer, the term of this patent is extended or adjusted under 35 U.S.C. 154(b) by 601 days.

(21) Appl. No.: 18/102,300

(22) Filed: Jan. 27, 2023

(65) Prior Publication Data

US 2023/0237377 A1 Jul. 27, 2023

Related U.S. Application Data

(60) Provisional application No. 63/303,713, filed on Jan. 27, 2022.

(51) Int. Cl.
*G06N 20/00* (2019.01)

(52) U.S. Cl.
CPC .................................... *G06N 20/00* (2019.01)

(58) Field of Classification Search
CPC ......... G06N 20/00; G06N 3/092; G06N 5/022
See application file for complete search history.

(56) References Cited

U.S. PATENT DOCUMENTS

| | | | | |
|---|---|---|---|---|
| 11,683,333 B1* | 6/2023 | Dominessy | ........... | H04L 43/045 726/25 |
| 2014/0223562 A1* | 8/2014 | Liu | ........ | G06N 3/006 726/23 |
| 2020/0410399 A1* | 12/2020 | Lang | ...... | G06N 3/045 |
| 2022/0094702 A1* | 3/2022 | Saad Ahmed | ......... | G06N 20/00 |

OTHER PUBLICATIONS

Nguyen, "Deep Reinforcement Learning for Cyber Security", Date of publication Nov. 1, 2021. (Year: 2021).*

* cited by examiner

*Primary Examiner* — Dave Misir

(74) *Attorney, Agent, or Firm* — Matney Legal Group PLLC

(57) ABSTRACT

A search agent training system includes a trainer device. The trainer device includes a trainer network simulation of variable size, which further includes at least one selectable action, at least one selectable node, and a trainer knowledge base, which further includes at least one selectable action outcome probability value. The trainer knowledge base is populated by a quantification system. The trainer device receives an incoming action message from a search agent device including a selected action and a selected node. Next, based upon: a resulting action outcome probability value, the selected action, and the selected node, a resulting observation and a resulting reward is sent to the search agent device. The trainer device blocks node count report messages to the search agent device from the trainer device.

17 Claims, 11 Drawing Sheets

*FIG. 4*

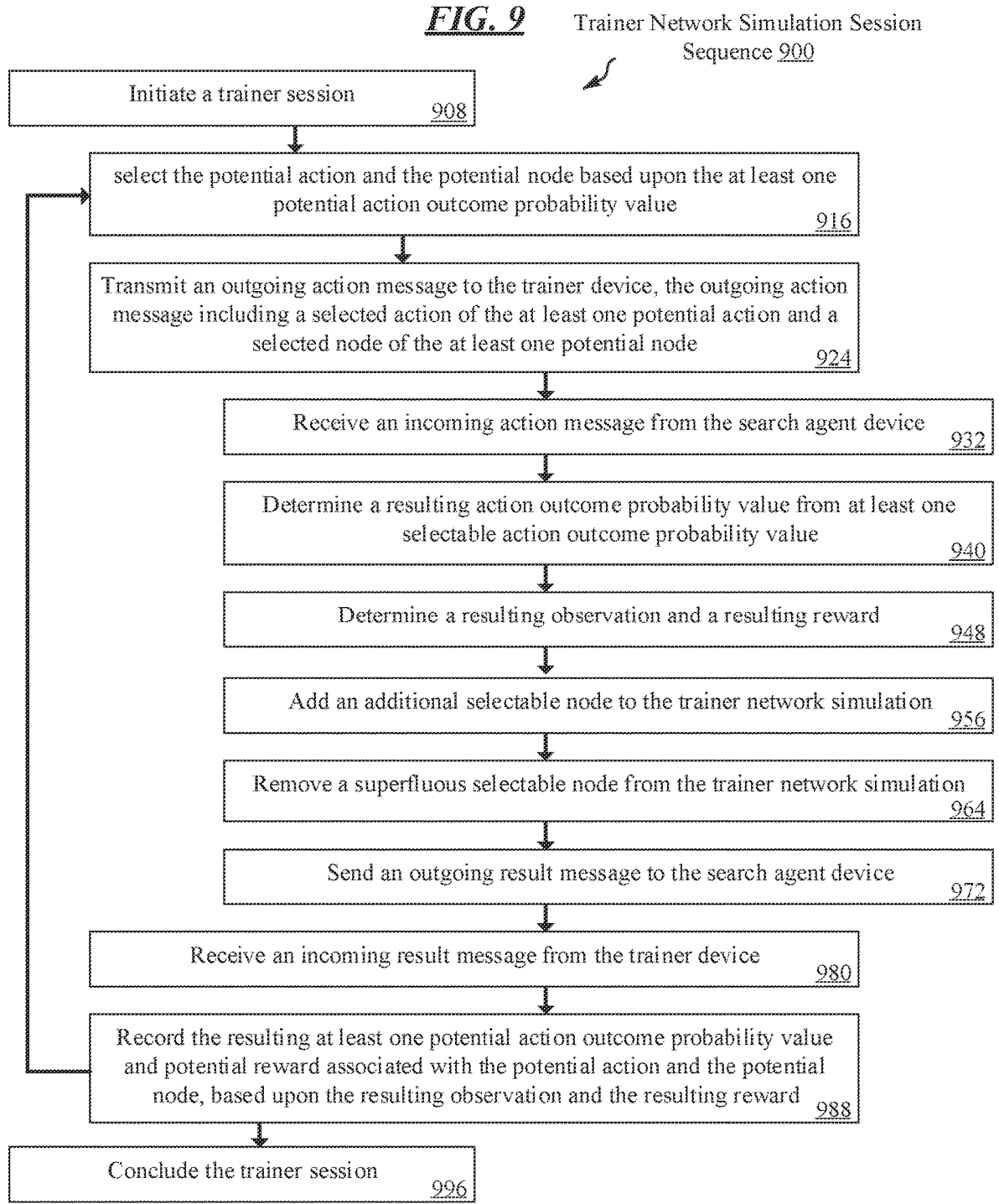

*FIG. 9*   Trainer Network Simulation Session
Sequence 900

Initiate a trainer session 908 select the potential action and the potential node based upon the at least one
potential action outcome probability value 916

Transmit an outgoing action message to the trainer device, the outgoing action
message including a selected action of the at least one potential action and a
selected node of the at least one potential node 924

Receive an incoming action message from the search agent device 932

Determine a resulting action outcome probability value from at least one
selectable action outcome probability value 940

Determine a resulting observation and a resulting reward 948

Add an additional selectable node to the trainer network simulation 956

Remove a superfluous selectable node from the trainer network simulation 964

Send an outgoing result message to the search agent device 972

Receive an incoming result message from the trainer device 980

Record the resulting at least one potential action outcome probability value
and potential reward associated with the potential action and the potential
node, based upon the resulting observation and the resulting reward 988

Conclude the trainer session 996

*FIG. 10*

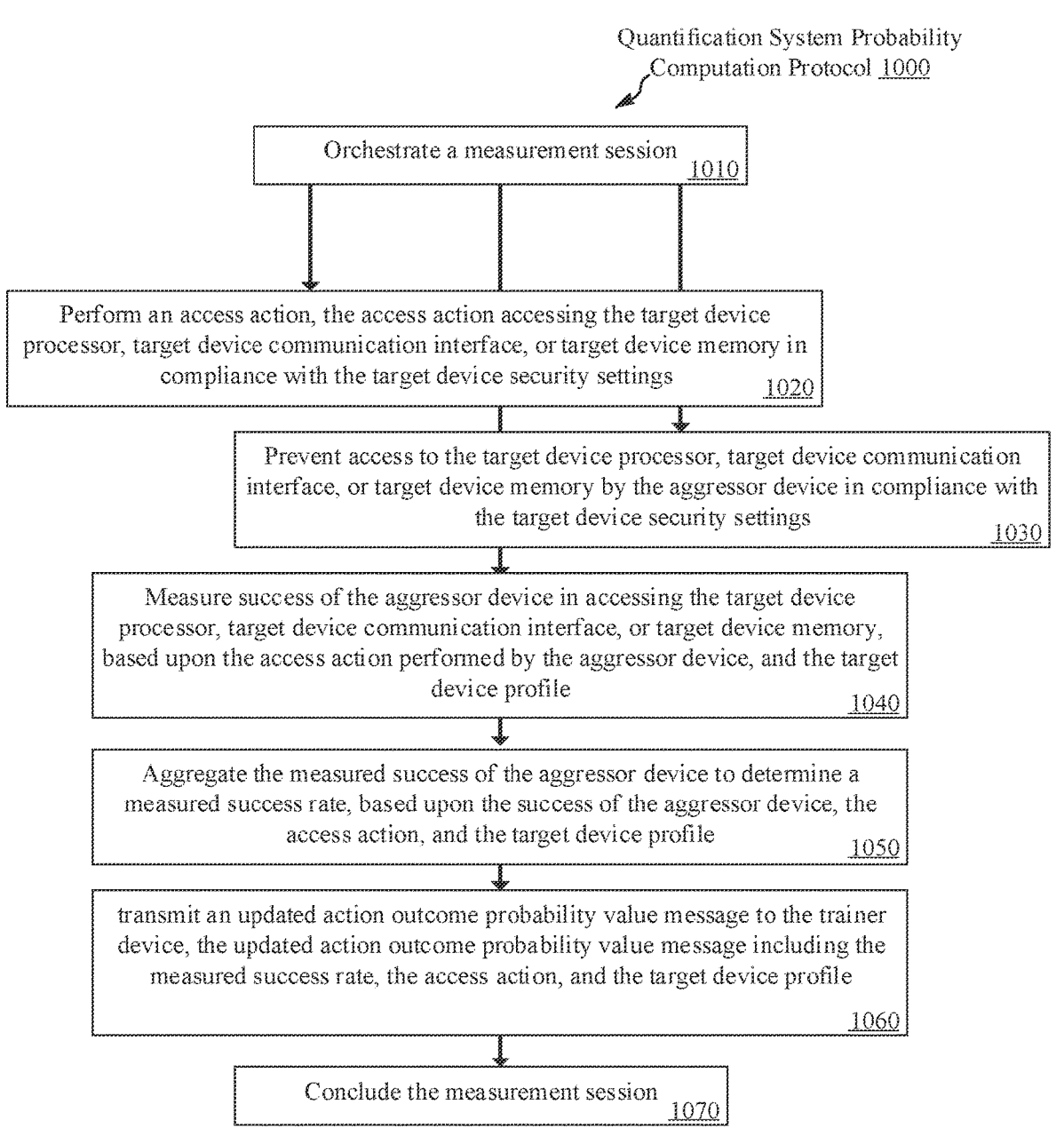

Quantification System Probability
Computation Protocol 1000

Orchestrate a measurement session 1010

Perform an access action, the access action accessing the target device processor, target device communication interface, or target device memory in compliance with the target device security settings 1020

Prevent access to the target device processor, target device communication interface, or target device memory by the aggressor device in compliance with the target device security settings 1030

Measure success of the aggressor device in accessing the target device processor, target device communication interface, or target device memory, based upon the access action performed by the aggressor device, and the target device profile 1040

Aggregate the measured success of the aggressor device to determine a measured success rate, based upon the success of the aggressor device, the access action, and the target device profile 1050 transmit an updated action outcome probability value message to the trainer device, the updated action outcome probability value message including the measured success rate, the access action, and the target device profile 1060

Conclude the measurement session 1070

*FIG. 11*    Search Agent Selection Method 1100

Determine a current state of all potential nodes

1110

Determine all possible proposals, a possible proposal including a pairing of a possible potential node and a possible potential action

*for possible potential node in potential nodes:*
*for possible potential actions in potential actions:*
*Pairs.append([possible potential node, possible potential action])*

1120

Group the possible proposals by the current state of the possible potential node of the pairing of the possible proposal and the possible potential action of the possible proposal $G = Pairs.groupby([pair.possible potential node.current state, pair.possible potential action])$

1130

Calculate the proposal value of each group of possible proposals, based upon a shared current state of each possible potential node within a respective group of possible proposals, and based upon a shared possible potential action of the respective group of possible proposals

*for g in G: calculate proposal value (g)*

1140

Apply the proposal value of the respective group to each pairing of a respective possible potential node and a respective possible potential action

*for pair in Pairs :*
*Pairs[pair] = (possible potential node, possible potential action, proposal value)*

1150

Select the proposed action and the proposed node based upon the proposal value associated with the proposed action and the proposed node

*Return max(Pairs, key=x:x[proposal value])*

1160

SYSTEM AND METHOD FOR PROBABILISTIC DECISION-MAKING UNDER UNCERTAINTY IN AUTONOMOUS CYBER OPERATIONS

CROSS-REFERENCE TO RELATED APPLICATIONS

This application claims priority to U.S. Provisional Patent Application No. 63/303,713, filed on Jan. 27, 2022, titled "System and Method for Probabilistic Decision-Making Under Uncertainty in Autonomous Cyber Operations," the entire disclosure of which is incorporated by reference herein.

TECHNICAL FIELD

The present subject matter relates to a system of training and testing computing devices and programs designed to penetrate an adversary computer network. More particularly, relates to a testing and training system with variably-sized simulated adversary computer networks.

BACKGROUND

Cyber penetration testing is the process by which a security specialist, or "hacker," attempts to subvert computer or computer network security. In a testing context, the hacker has been granted permission to attempt to subvert a given network or computer. Permitted hackers test the security and safety of the permitting organization's computing systems. Hackers have several broad strategies for gaining access to computer systems, such as social engineering or denial-of-service attacks, but digital exploitative methods are often preferred, due to their ability to gain control of some or all of an organization's computing systems, and due to the fact that they often can be executed remotely.

While most cyber penetration testing is discussed in the context of defending a computer network from a hacker's attack and how to best build a bulwark against malicious actors, the attacker's side of penetration testing cannot be overlooked. The world of cyber security suffers from "unknown unknowns," where security experts do not necessarily know what vectors of attack their adversaries may have devised or discovered (if they even know who their adversaries are) and therefore can have great difficulty in defending against these unknown, undefined, but nevertheless very real threats. Developing offensive cyber penetration tools allows for designing responsive defensive cyber protection tools: to design a defense against an unknown offense is an extremely challenging task. Therefore, developing effective offensive cyber penetration tools as well as effective defensive cyber penetration prevention tools is important in the cyber security space, even to parties only interested in offensive or defensive capabilities.

In addition, cyber penetration tools deployed for offensive purposes also have substantial value, particularly in a military context. Offensively hacking an opposing military force can obviate the need for a physical assault. The military advantage of disabling targets of interest in remote, undeveloped, or contested areas of the world without having to perform a physical incursion is considerable. Complementarily, effectively preventing an offensive hacking attempt secures the digital or electronic-based assets an opponent is attempting to disable, and can force such an opponent further facing overwhelming physical force to accept surrender when their hacking attempts are frustrated.

Current approaches to attacking cyber networks assume that these attacks are conducted as part of an automated penetration testing exercise. In such an exercise, the topology of the network under test is fully known. As a result, the total number of states and actions in the network is recursively enumerable (i.e., it is knowable). The problem with these approaches is that in real-world cyber network operations, the topology of the network being attacked is not known ahead of time. This presents serious limitations to planning and decision-making offensive and defensive algorithms, which typically require that the actions and the states in the environment are finite and can be reasoned about, if only implicitly. Additionally, current approaches do not address a set of probability distributions to serve as a sensor model or model of transition dynamics. Further, while current approaches consider high level categories for devices (operating system, service pack, processor architecture, etc.), these approaches do not incorporate more detailed device states into the probability of an exploit working, such as processes running on the device, and memory being used by the device.

SUMMARY

Hence, there is room for further improvement in systems and methods for training and testing computing devices and programs designed to penetrate adversary computer networks. By training penetration testing systems against computer networks of variable size, the penetration testing systems are both more robust, and are more prepared for real-world operations. In an actual, real-world deployment, a penetration testing system would likely not have information on the total size of the targeted computer network—therefore, training against a simulated network of variable size will prepare the penetration testing system more effectively than a similar training against a simulated network of a fixed, known size. Furthermore, in some examples, the size of the simulated network may change during the course of the simulation, which further reduces the metaphorical distance between the simulation and real-world applications: in a real-world network, devices come and go regularly—cell phones, laptops, and all sorts of Internet-of-Things (IoT) devices come into range of a given wireless network, join the network, then leave the network as they go out of range of the wireless network. By mimicking this behavior, the penetration testing system can learn that opportunities may come and go, and to potentially target with priority devices that appear to be temporary members of a computer network.

In an example, a search agent training system 100 includes a trainer device 105. The trainer device 105 includes a trainer device processor 215 and a trainer device communication interface 220. The trainer device communication interface 220 is configured for data communication with a search agent device 170A, and is coupled to the trainer device processor 215. The trainer device 105 further includes a trainer device memory 110, coupled to the trainer device processor 215 of the trainer device 105. The trainer device memory 110 includes a trainer network simulation 115A, which further includes: at least one selectable action 111A-N, at least one selectable node 112A-N, and a trainer knowledge base 120, which further includes at least one selectable action outcome probability value 121A-N. The at least one selectable action outcome probability value 121A is associated with at least one selectable action 111A and at least one selectable node 112A. The trainer device memory further includes trainer device programming 230 in the trainer device memory 110. Execution of the trainer device programming 230 by the trainer device processor 215 of the trainer device 105 configures the trainer device 105 to implement the following functions. First, the trainer device 105 receives an incoming action message 270A from the search agent device 170A, the incoming action message 270A including a selected action 211A of the at least one selectable action 111A-N and a selected node 212A of the at least one selectable node 112A-N. Second, the trainer device 105 determines, based upon the selected action 211A and the selected node 212A, a resulting action outcome probability value 254A from the at least one selectable action outcome probability value 121A-N associated with the selected action 211A and the selected node 212A. Third, the trainer device 105 determines, based upon: the resulting action outcome probability value 254A, the selected action 211A, and the selected node 212A, a resulting observation 251A and a resulting reward 252A. Fourth, the trainer device 105 sends an outgoing result message 270B to the search agent device 170A, the outgoing result message 270B including the resulting observation 251A and the resulting reward 252A. Fifth, the trainer device 105 blocks a node count report message 270C to the search agent device 170A from the trainer device 105.

In a second example, a search agent device 170A includes a search agent device processor 315A and a search agent device communication interface 320A. The search agent device communication interface 320A is configured for data communication with a deployment device 560A and is coupled to the search agent device processor 315A. The search agent device 170A further includes a search agent device memory 175A, coupled to the search agent device processor 315A of the search agent device 170A and configured to accept a variable amount of at least one potential node 112A. The search agent device memory 175A includes at least one potential action 111A, the at least one potential node 112A, and a search agent knowledge base 320, which further includes at least one potential action outcome probability value 321A-N, the at least one potential action probability value 321A associated with at least one potential action 111A, the at least one potential node 112A and a potential reward 352A. The search agent device memory 175A further includes search agent device programming 330 in the search agent device memory 175A. Execution of the search agent device programming 330 by the search agent device processor 315A of the search agent device 170A configures the search agent device 170A to implement the following functions: First, the search agent device 170A selects a selected action 211A of the at least one potential action 111A and a selected node 212A of the at least one potential node 112A based upon the at least one potential action outcome probability value 321A. Second, the search agent device 170A transmits an outgoing action message 270A to the deployment device 560A, the outgoing action message 270A including the selected action 211A and the selected node 212A. Third, the search agent device 170A receives an incoming result message 270B from the deployment device 560A, the incoming result message 270B including a resulting observation 251A. Fourth, the search agent device 170A determines a resulting reward 252A based upon the resulting observation 251A. Fifth, the search agent device 170A records the resulting at least one potential action outcome probability value 321A and potential reward 352A associated with the potential action 111A and the potential node 112A, based upon the resulting observation 251A and the resulting reward 252A.

In a third example, a trainer knowledge base 320 including potential action outcome probability values 321A-N is produced by first, receiving an incoming action message 270A from the search agent device 170A, the incoming action message 270A including a selected action 211A of the at least one selectable action 111A-N and a selected node 212A of the at least one selectable node 112A-N. Second, by determining, based upon the selected action 211A and the selected node 212A, a resulting action outcome probability value 254A from the at least one selectable action outcome probability value 121A-N associated with the selected action 211A and the selected node 212A. Third, by determining, based upon: the resulting action outcome probability value 254A, the selected action 211A, and the selected node 212A, a resulting observation 251A and a resulting reward 252A. Fourth, by sending an outgoing result message 270B to the search agent device 170A, the outgoing result message 270B including the resulting observation 251A and the resulting reward 252A. Fifth, by updating the potential action outcome probability values 321A-N based upon the selected action 211A, the selected node 212A, the resulting observation 251A, the resulting reward 252A, or a combination thereof.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 4 is a block diagram of an orchestrator device of the search agent training system.

FIG. 9 is a flowchart diagramming of a trainer network simulation session sequence of the search agent training system.

FIG. 10 is a flowchart diagramming of a quantification system probability computation protocol of the quantification system.

FIG. 11 is a flowchart diagramming of a search agent selection method of the search agent device.

DETAILED DESCRIPTION OF THE DRAWINGS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the signals, actions, or messages.

Figure 1:
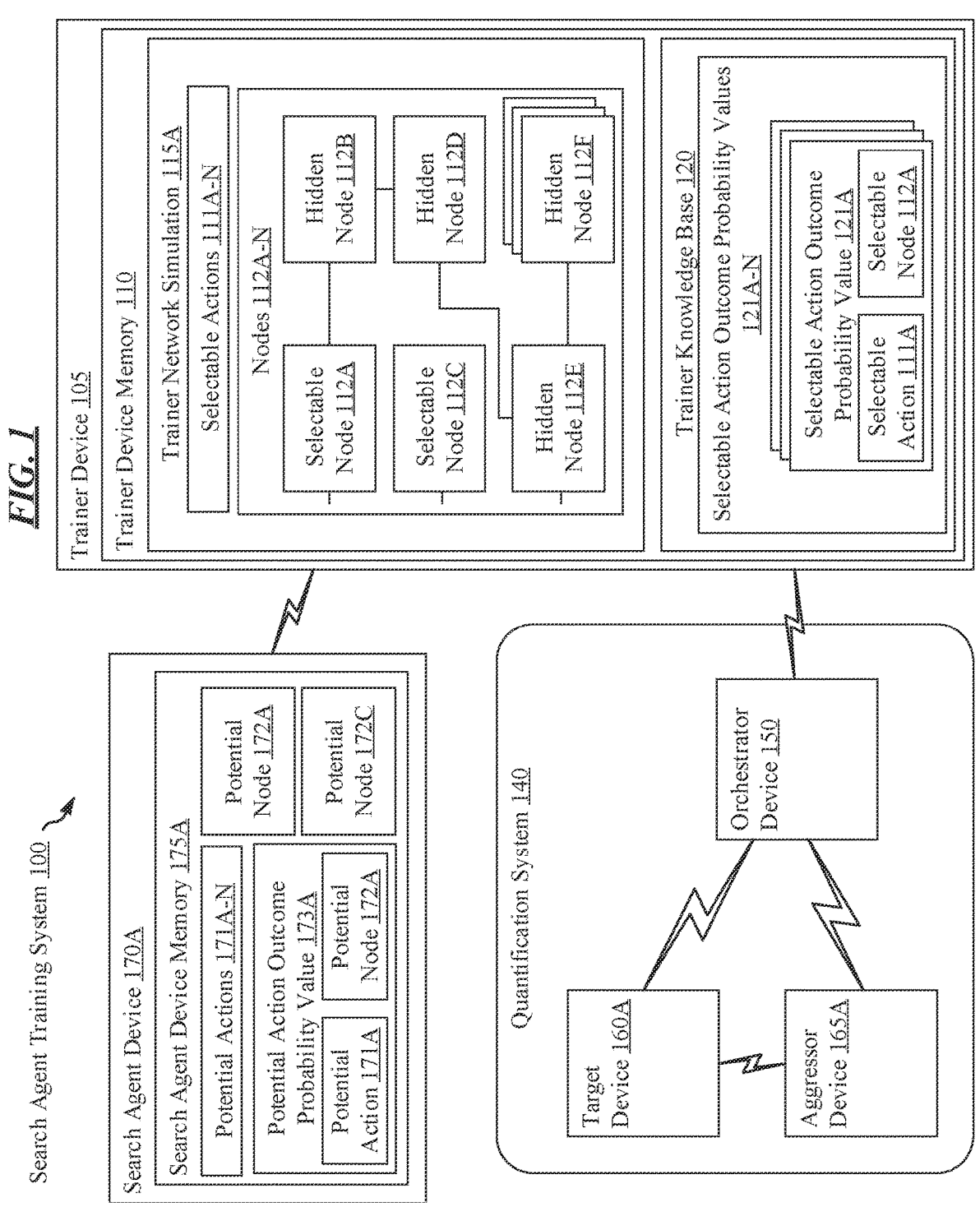
FIG. 1 is a high-level functional block diagram of an example of a search agent training system that includes a trainer device, a single search agent device, and a quantification system with an orchestrator device, a single target device and a single aggressor device.

Reference now is made in detail to the examples illustrated in the accompanying drawings and discussed below. FIG. 1 is a high-level functional block diagram of an example of a search agent training system 100 that includes a trainer device 105, a single search agent device 170A, and a quantification system 140 with an orchestrator device 150, a single target device 160A and a single aggressor device 165. Broadly, the trainer device 105 simulates a cyber computing network, which the search agent device 170A attempts to access, using virtual actions or exploits. The probability of a given action or exploit performed by the search agent 170A being successful, and what success or failure will yield, is determined by the quantification system 140. The orchestrator device 150 of the quantification system 140 sets an aggressor device 165A substantially similar to the search agent device 170A against a target device 160A, and records whether the aggressor device 165A can access the target device 160A, as well as what kind of access or information the aggressor device 165A receives upon success. The orchestrator device 150 then reports these probabilities and results back to the trainer device 105, in order for the trainer device to have testing-derived data upon which to base a more accurate trainer network simulation 115A.

The trainer device 105, also known as a gym, comprises a trainer network simulation 115A and a trainer knowledge base 120 within the trainer device memory 110. The trainer network simulation 115A implements all of the logic required to simulate and model a realistic cyber network under test. In particular, it includes one or more nodes 112A-N which represent computing devices on the modeled cyber network. For example, a node 112A may represent an android phone, running android version 12.0, with eight gigabytes of total memory installed, and four of those eight gigabytes of total memory installed, and four of those eight gigabytes free and not in active use. Any or all of those traits may be relevant to the search agent device 170A. Nodes 112A-N may be selectable, meaning that the search agent device 170A has an awareness of the node 112A,C, at minimum an awareness that the node 112A,C is within the trainer network simulation 115A. Nodes 112A-N may also be hidden, meaning that the search agent device 170A has no awareness of the node 112B,D-F. Search agent device 170A, as search agent device 170A interacts with the trainer network simulation 115A, generally will become aware of more nodes 112B,D-F, thus converting a hidden node to a selectable node. The status of "Selectable" or "hidden" is not necessarily a discrete variable stored within the nodes 112A-N, the trainer network simulation 115A, or the search agent device 170A: The search agent device 170A necessarily does not know about hidden nodes 112B,D-F, and therefore all existing nodes the search agent device 170A is aware of are definitionally selectable nodes 112A,C. Relatedly, the trainer device 105 may be agnostic to whether the search agent device 170A is aware of any given node; or alternatively, the trainer device 105 may not be aware of what the search agent device 170A is aware of. As an example, search agent device 170A may be aware that certain computers on a network always assign certain Internet Protocol (IP) addresses in sequence. The search agent device 170A may then be able to intuit internally the IP address of hidden node 112B, despite the trainer device 105 never explicitly reporting the IP address of hidden node 112B. Hidden node 112B would therefore no longer be "hidden" as search agent device 170A is aware that it must exist, yet the trainer device 105 is ignorant of this knowledge within search agent device 170A, and therefore could not update a variable to signal that "hidden" node 112B is now a "selectable" node 112B.

The nodes 112A-F are shown with connections between certain nodes 112A-F: if the search agent device 170A has a goal of traversing the entire network, or of finding a particular node 112F, then the search agent device 170A must follow along valid connections between nodes 112A-F. In this example, there are also three nodes 112A,C,E with access points (represented as short lines extending from the left side of the nodes 112A,C,E), into which the search agent device 170A may connect to the nodes 112A-N of the trainer network simulation 115A. In an example, assume the search agent device 170A has a goal of accessing the node 112F. The search agent device 170A only has awareness of selectable nodes 112A,C. Selectable node 112C is a dead-end: it does not connect to the remainder of the nodes 112A-B,D-N. Selectable node 112A eventually connects to node 112F, after passing through nodes 112B,D,E. Hidden node 112E connects directly to node 112F, and has an access point, but search agent device 170A is unaware of hidden node 112E, and thus is unable to attempt to exploit hidden node 112E for access to hidden node 112F. Additionally, search agent device 170A at the beginning of the trainer network simulation 115A likely has no awareness that selectable node 112C is a dead-end, and may waste simulation time attempting to exploit selectable node 112C for no material gain.

The trainer network simulation 115A has a list of selectable actions 111A-N which the search agent device 170A is capable of undertaking. Generally, a search agent device 170A will attempt to "win" by any means necessary: if the goal of the search agent device 170A is to, for example, disable the entire network of nodes 112A-N, and the search agent device 170A could transmit any command to the trainer device 105, the search agent device 170A might direct the trainer device 105 to delete every node 112A-N, or delete the entire trainer network simulation 115A—if the nodes 112A-N are removed, then they are technically disabled as well. Alternatively, as most search agent devices 170A are designed with a "points" goal (e.g. "score the maximum number of points within the trainer network simulation 115A") the search agent device 170A may direct the trainer device 105 to assign the search agent device 2,147,483,647 points, which in this particular example is a maximum amount of points. In both of the prior examples, the search agent device 170A "wins", but is not well-trained to perform an incursion into a real-life cyber network that does not politely shut itself off upon request. Therefore, only certain selectable actions 111A-N may be undertaken by the search agent device 170A: selectable actions 111A-N which further the objective of properly training the search agent device 170A to be more effective in a real-world deployment, and not actions which allow the search agent device 170A to "cheat" the trainer network simulation 115A.

The trainer network simulation also has a trainer knowledge base 120, which contains all of the selectable action outcome probability values 121A-N. Given that there are a limited set of selectable actions 111A-N, and a limited set of nodes 112A-N, there is a limited set of outcomes for the search agent selecting a selectable action 111A-N to take against a selectable node 112A-N. These selectable action outcome probability values 121A-N capture this information, allowing the trainer device 105 to, first, determine whether the search agent device 170A succeed or fails, and additionally what occurs afterwards to the search agent device 170A and the trainer network simulation 115A. As an example, the search agent device 170A may select to brute force a password on selectable node 112A, using a particular Rainbow Table Attack. Selectable node 112A may be an Android phone, running Android 12.0: The selectable action outcome probability value 121A for a "First Rainbow Table Attack" against "Android running Android 12.0" may be 5%. A successful First Rainbow Table Attack yields full access to selectable node 112A, and a failure may result in selectable node 112A being unavailable for 30 seconds of simulated time. The trainer device 105 generates a success or failure value based upon that selectable action outcome probability value 121A of 5%. Selectable action outcome probability values 121A-N can also include aggressor device 165A:target device 160A pairs, also known as weapon:target delegates. Weapon:target delegates include selecting a particular aggressor devices 165A as the selectable action 111A, rather than a particular exploit implemented by that particular aggressor device 165A. In such examples, the weapon:target delegates (i.e., selectable action outcome probability values 121A-N) describe the probability that a given aggressor device 165A, configured to be deployed against a given target device 160A to achieve a certain goal, will succeed or fail, and what will occur afterward within the trainer network simulation 115A.

There are many known methods for generating a random result; one is to generate a random number between 0 and 1, and then determine if that random number is smaller than the selectable action outcome probability value 121A: if the number is smaller or equal, then the result is "Success"; otherwise, "Failure". Continuing with the example, assuming the result is "Failure", the trainer network simulation then closes access to the selectable node 112A for thirty simulated seconds, and informs the search agent device 170A of the failure, and awards no points to a points-seeking search agent device 170A.

The selectable outcome action probability value does not need to be binary "Success" or "Failure", and outcomes may be a mix of positive and negative: an example is an outcome which grants access to a node 112B, but blocks access to another node 112D, or prevents certain selectable actions 111A-N from being successfully selected for the remainder of the trainer network simulation 115A. The trainer device 105 does not need to report to the search agent device 170A that a failure occurred, insofar as certain selectable actions 111A-N will be ineffective. Returning to the example with selectable node 112A unavailable for thirty seconds of simulated time due to a failed First Rainbow Table Attack: search agent device 170A may not be informed explicitly that selectable node 112A is unavailable, and without taking proper measures, search agent device 170A may waste time attempting to access selectable node 112A, or may worsen the outcome. As an example, if a Second Rainbow Table Attack is applied to selectable node 112A while it is unavailable due to a prior Rainbow Table Attack, the thirty seconds of simulated time will be reset, and extended by a further thirty seconds. A search agent device 170A may effectively lock itself out of the entire trainer network simulation 115A if all of the nodes 112A,C,E with access points are unavailable for the remainder of the trainer network simulation 115A.

Search agent device 170A is a penetration testing device, preferably implementing an algorithm to select optimal potential actions 171A against potential nodes 172A, the algorithm preferably being a learning artificial intelligence (A.I.) algorithm. The search agent device 170A has a search agent device memory 175 which contains a list of the potential actions 171A-N the search agent device 170A may undertake. The potential actions 171A-N are a subset of the selectable actions 111A-N: there is no action the search agent device 170A may validly undertake, which the trainer network simulation 115A is unaware of Any action the search agent device 170A may undertake outside of the selectable actions 11A-N would either be nonsensical, or would be a penetration exploit against the trainer device 105 itself, and not the nodes 112A-N within the trainer network simulation 115A.

The search agent device 170A tracks potential nodes 172A,C, which mirror the selectable nodes 112A,C. The search agent device 170A does not have potential nodes tracked for the hidden nodes 112B,D,F, as the search agent is unaware of these hidden nodes 112B,D,F, and thus cannot strategize based on their existence.

The search agent device also tracks potential action outcome probability values 173A, for a given potential action 171A and potential node 172A. However, the potential action outcome probability value 173A likely does not mirror exactly the selectable action outcome probability values 121A-N within the trainer device 105. This discrepancy is due to the search agent device 170A determining the probability within the potential action outcome probability value 173A through trial and error, whereas the values within the trainer knowledge base 120 are assumed to be correct for the purposes of the trainer network simulation 115A. There are likely less potential action outcome probability values 173A, as potential action outcome probability values 173A can only exist for potential actions 171A and potential nodes 172A for which an action has been undertaken by the search agent device 170A. Furthermore, there may be nuances between two selectable actions 111A-B that the search agent device 170A is unaware of, and therefore the search agent device 170A may lump the two selectable actions 111A-B together into a single potential action 112A. Returning to the prior example with the "First Rainbow Table Attack" and the "Second Rainbow Table Attack": though the trainer knowledge base 120 may reflect that these are technically two different scenarios, with different outcomes and outcome probabilities, the search agent device 170A may not have deduced that nuance, and may only track outcomes and outcome probabilities for "Rainbow Table Attack", and not discern the increasingly strict punishments for multiple successive Rainbow Table Attack failures on the same selectable node 112A.

The quantification system 140 communicates with the trainer device 105 to improve the trainer network simulation quality 115A. Though the trainer knowledge base 120 is presumed to be correct for the purposes of the trainer network simulation 115A, in actuality the probabilities and outcomes stored within the trainer knowledge base 120 may be materially inaccurate. Continuing the prior example, Rainbow Table Attacks may have a 0.0005% chance of success in real-life; further, five consecutive failed Rainbow Table Attacks may not lock the search agent device 170A out for two and a half minutes, but rather might trigger a factor reset of the Android device running Android 12.0, which selectable node 112A purports to simulate. These drastically different outcomes and outcome probabilities within the trainer network simulation 115A versus those found in the real world are resulting in a mis-trained search agent device 170A: one which may over rely on Rainbow Table Attacks, to the detriment of the owner of the search agent device 170A.

To alleviate this problem, the quantification system 140 generates accurate probability data and outcomes by simulating actual penetration testing devices attempting to access defensive computing devices. An aggressor device 165A, preferably configured substantially similarly to the search agent device 170A, with the same potential actions 171A available, attempts to perform a given potential action 171A against a target device 160A, which attempts to resist the potential action 171A. To clarify, the search agent device 170A when interfacing with the training device does not actually perform a Rainbow Table Attack, which involves waiting for a user to enter their password into a device, capturing the transmitted message containing the encrypted password, attempting to decrypt the password, and then attempting to log into the device with the unencrypted password. Instead, the search agent device 170A mimes the effort, telling the training device "I hypothetically perform a Rainbow Table Attack; am I successful?" The aggressor device 165A, at the direction of the orchestrator device 150, monitors network traffic to the target device 160A, waits for a simulated user to enter their password into the target device 160A over a simulated network, captures the transmitted message containing the encrypted password, attempts to decrypt the password, and then attempts to log into the target device 160A with the unencrypted password. The orchestrator device 150 monitors this entire process, records the results, and then updates the selectable action outcome probability values 121A-N in the trainer knowledge base 120. Continuing the prior example, after ten thousand attempts by the aggressor device 165A to access the target device 160A via a Rainbow Table Attack, the orchestrator device 150 will ascertain that the probability of 5% is too high, and a probability of 0.0005% is more accurate. The orchestrator device 150 will then update the trainer knowledge base 120 with this information, thereby improve the fidelity of the trainer network simulation 115A, and ideally the performance of the search agent device 170A.

The quantification system 140 is preferably virtualized, to allow for multiple aggressor devices 165A to pair with multiple target devices 160A to obtain results faster. Other competing designs for search agent training systems may drop the selectable action outcome probability values 121A-N: if the search agent device 170A seeks to perform a Rainbow Table Attack, the search agent device 170A must perform a Rainbow Table Attack against a selectable node 112A implemented as a fully-formed, virtualized machine, and determine success or failure based upon the outcome of the attempted Rainbow Table Attack. However, some actions or exploits can take substantial time to undertake: entering ten thousand passwords at a thousand passwords a second takes ten seconds; a Rainbow Table Attack based on intercepted network traffic necessarily requires waiting for network traffic containing a password. Requiring the search agent device 170A to perform all actions against virtualized or physical machines, may cause a trainer network simulation 115A to take seconds, minutes, or hours of real time. By simulating the actions and the results, rather than waiting thirty minutes for a user to inadvertently log in, the search agent device 170A can send a single message with the potential action 171A and potential node 172A, and the trainer device 105 can respond with (after consulting the trainer knowledge base 120) "Success; access granted to node 112A; thirty minutes elapsed"—all in under a millisecond. By simulating rather than virtualizing and literally hacking machines, the search agent device 170A can complete a trainer network simulation 115A in under a real-life second, even if the equivalent real-life network penetration attempt would have taken three weeks. Faster simulations that do not sacrifice accuracy allow the A.I. implemented within the search agent device 170A to learn faster and generally produce better outcomes. Quick learning iteration allows the technicians configuring the A.I within the search agent device 170A to identify issues more quickly, and improve the function of the A.I. algorithm itself.

The trainer network simulation 115A is not required to simulate an elaborate network: in some circumstances simulating a single node 112A is sufficient for training purposes. A general-purpose autonomous search agent device 170A with the capability to exploit any target device 160A can be more complex than is required for many applications. In practice, the creation of connectivity chains to enable cyber operations does not require the exploitation of arbitrary target devices 160A-N, which would in turn require being able to operationalize exploits for every conceivable type of host or node 112A-N. Therefore, rather than creating a general-purpose search agent device 170A, individual, purpose-designed search agent devices 170A are purpose-selected and run against a target device 160A. The result is essentially the trainer knowledge base 120, except rather than storing selectable action outcome probability values 121A comparing a selectable action 111A to a selectable node 112A, the selectable action outcome probability value 121A compares a selectable search agent device 170A, configured like a particular aggressor device 165A, to a selectable node 112A. This method of training improves performance of both the search agent devices 170A and the trainer device 110 not by building a larger and larger trainer network simulation 115A, but by increasing the number of small, high-fidelity, and discrete emulated environments which have a selectable action outcome probability value 121A selectable search agent device 170A, configured like a particular aggressor device 165A, to a selectable node 112A. This method succeeds because the search agent device 170A does not have to implicitly learn how to fingerprint a target device 160A and choose an applicable exploit or selectable action 111A; instead, the search agent device 170A is only tasked with responding to observations from a selectable node 112A emulating a target device 160A in a single-node trainer network simulation 115A, reasoning about the unknown internal state of the selectable node 112A, and deciding how best to apply a single exploit or selectable action 111A.

The Selectable Action 111A: Selectable Node 112A paired reinforcement learning (RL) delegates overcomes the challenges which current RL approaches face: a single agent/environment gym that encompasses all scenarios. Hierarchical delegates can be trained in specific (exploit, emulated target) paired environments. Additionally, these paired environments can also be used to empirically arrive at the set of probability distributions to serve as a sensor model or model of transition dynamics. Those probability distributions are the selectable action outcome probability values 121A-N stored in the trainer knowledge base. The quantification system 140 computes these probabilities with an orchestrator device 150 spinning up virtual machines to act as target devices 160A and aggressor devices 165A in an ESXi environment. The orchestrator device 150 repeatedly puts a fresh VM in a desired state, then attempts to exploit the VM and determine the success of the exploit. The number of successes determines the probability reported to the trainer knowledge base 120 which in turn closes the gap between simulated and real network behavior.

Though the search agent device 170A is described as a network penetration device, there is no limitation on the search agent device 170A being a network penetration prevention device. In some examples, the search agent device 170A is configured to select actions to prevent an offensive search agent device 170B from accessing certain nodes 112A-N, or to recover corrupted or hacked nodes 112A-N. For example, the search agent device 170A may be tested in a trainer network simulation 115A where the offensive search agent device 170B has already taken administrator control of selectable nodes 112A, 112C, and has read access to the network topology information available to the hidden node 112E. The defensive search agent device 170A may be tasked with preventing further incursion by the offensive search agent device 170B, and recovering administrative control over selectable nodes 112A, 112C. The defensive search agent 170A may also have additional selectable actions available beyond those of the offensive search agent 170B, due to privileges of being aligned with the owner of the trainer network simulation 115A: disconnecting or removing power from the selectable nodes 112A, 112C may be an acceptable to the defensive search agent device 170A, as the cost of machine downtime for the selectable nodes 112A, 112C incurred while the nodes 112A, 112C are offline are outweighed by the damage administrator access to those nodes 112A, 112C incurs— similarly, deleting sensitive data from hidden node 112F may be preferable to allowing access to that data, especially if the trainer network simulation 115A posits that an offline backup exists of the sensitive data.

Figure 2:
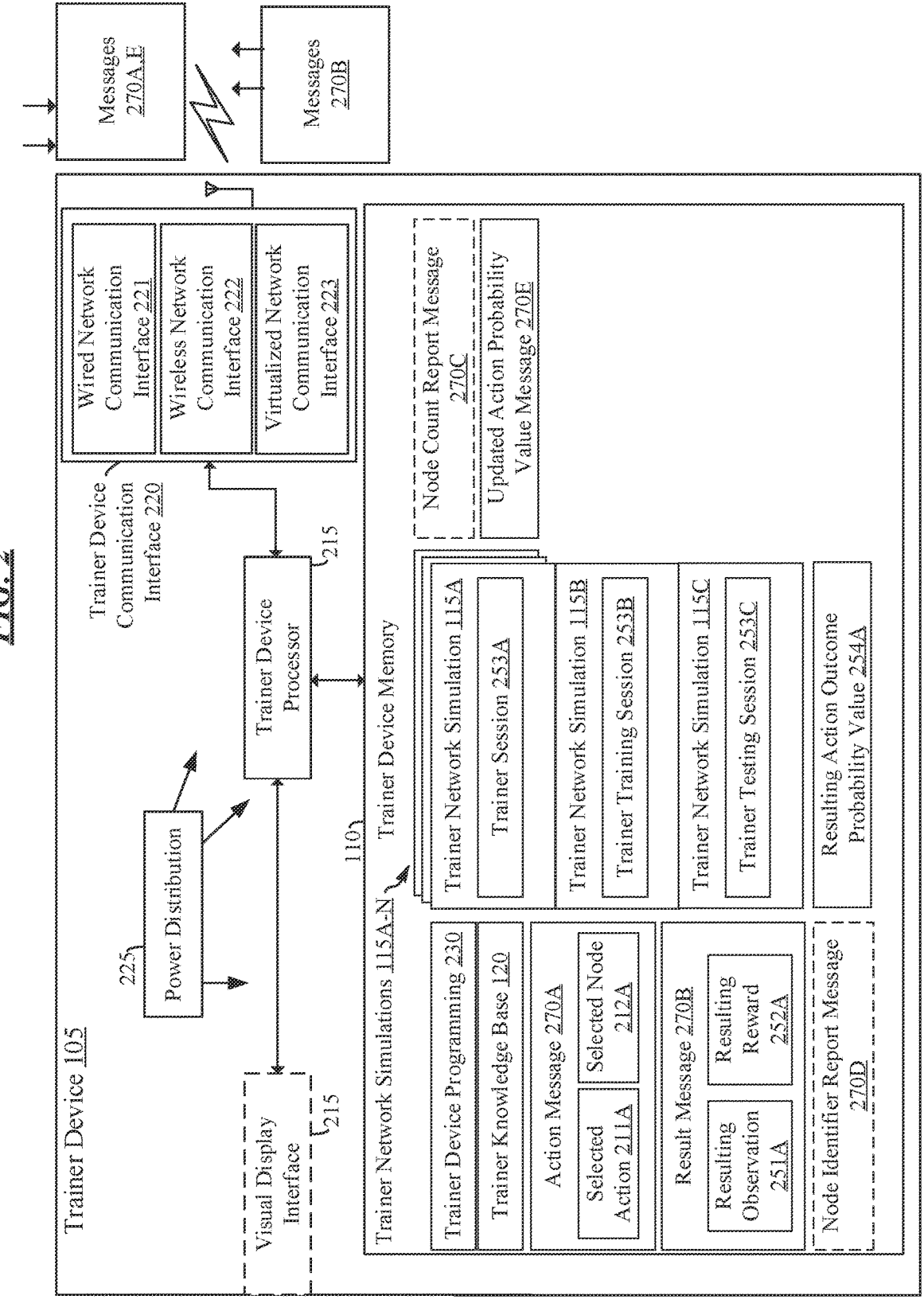
FIG. 2 is a block diagram of a trainer device of the search agent training system.

FIG. 2 is a block diagram of a trainer device 105 of the search agent training system 100. In this example, the trainer device 105 is a physical computing device, however as shown in FIG. 6 the trainer device 105 may be implemented as a virtual machine.

Trainer device 105 includes power distribution circuitry which distributes power and ground voltages to the trainer device processor 215; trainer device memory 110; and trainer device communication interface 220. Trainer device processor 215 includes a central processing unit (CPU) that controls the operation of the trainer device 105. Trainer device memory 110 can include volatile and/or non-volatile storage.

As shown, trainer device processor 215 is coupled to a trainer device communication interface 220 for receiving and transmitting various messages 270A-E for the trainer device 105.

Figure 3:
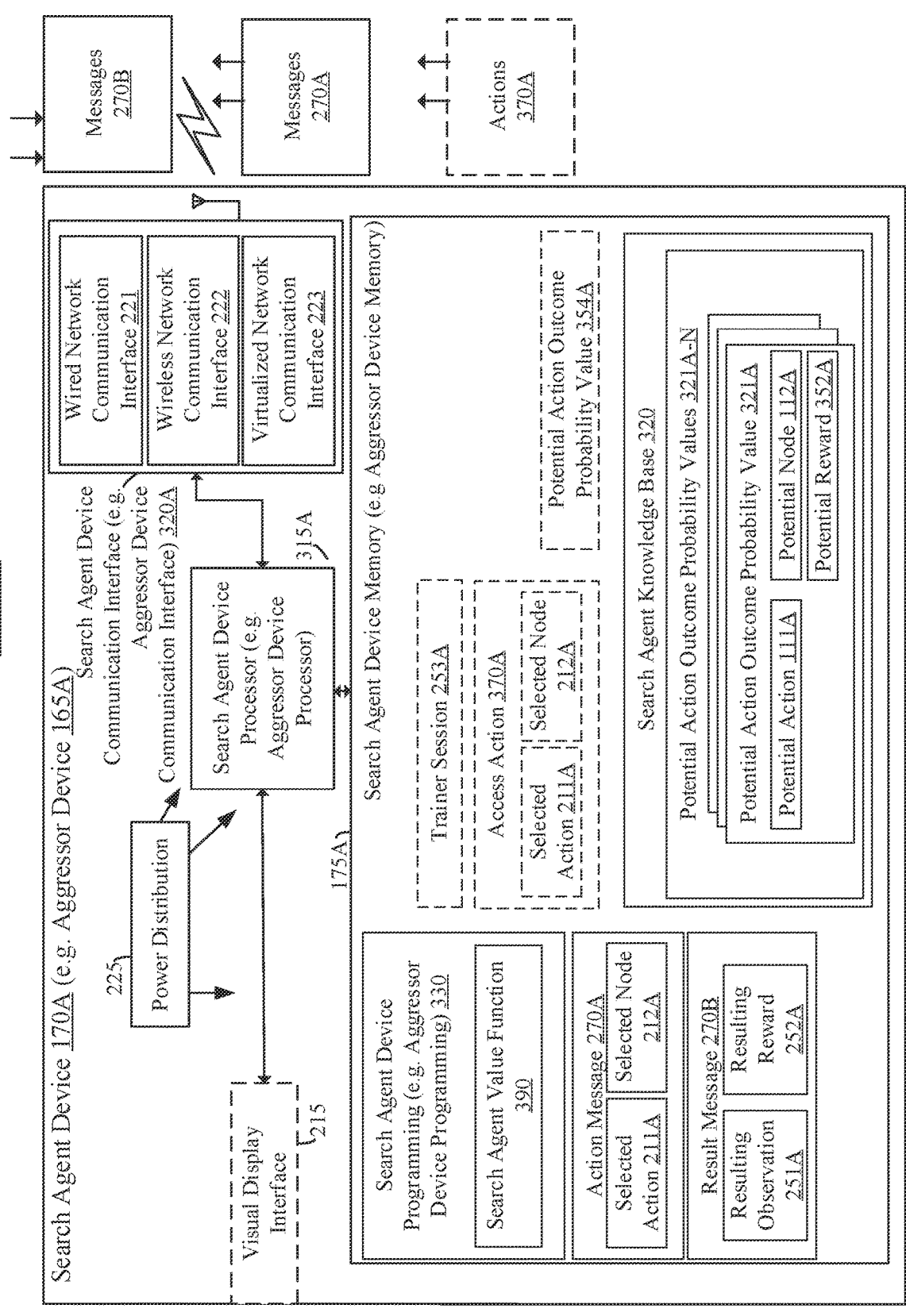
FIG. 3 is a block diagram of a search agent device, or an aggressor device, of the search agent training system.
Figure 4:
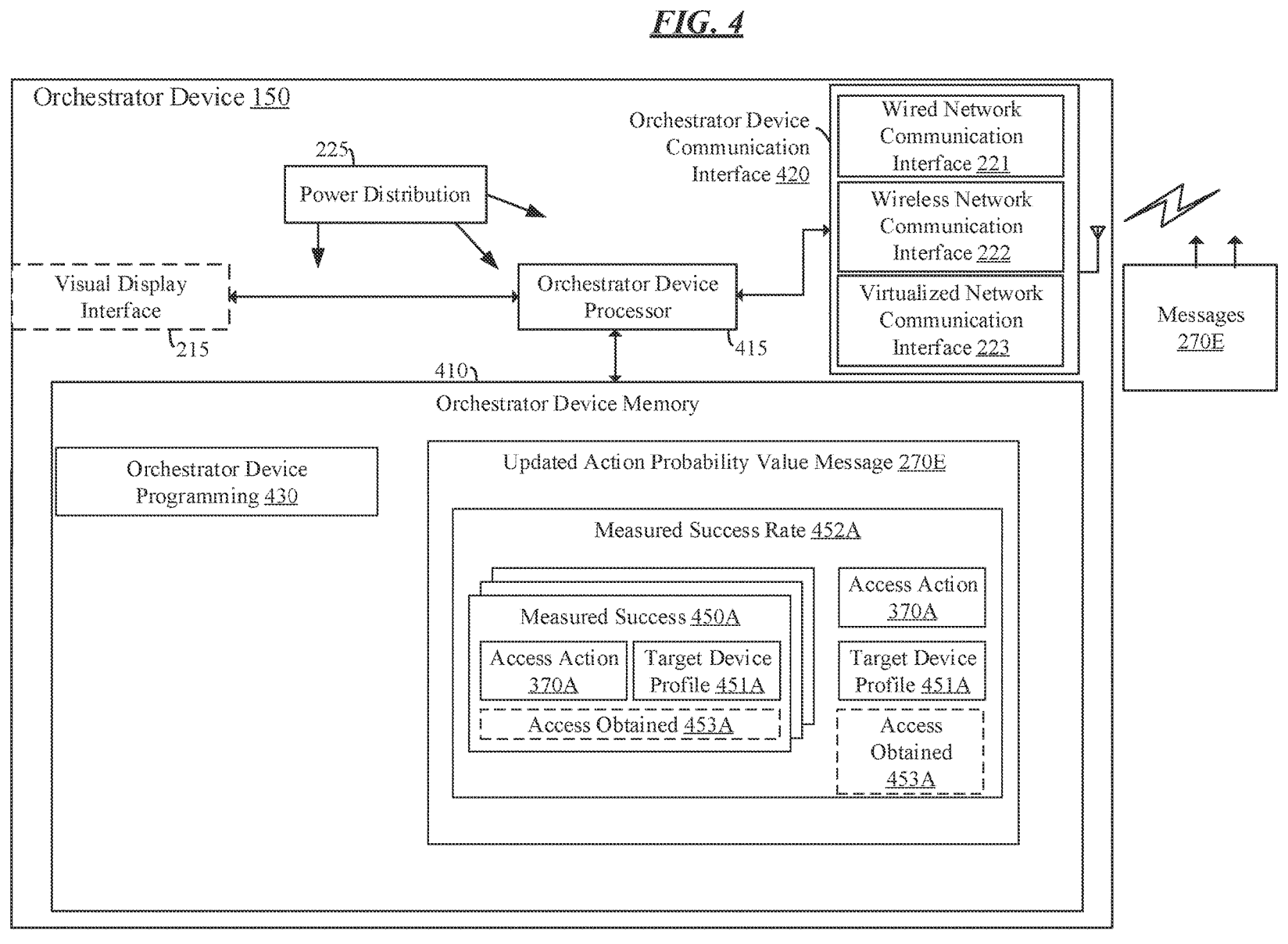
Figure 5:
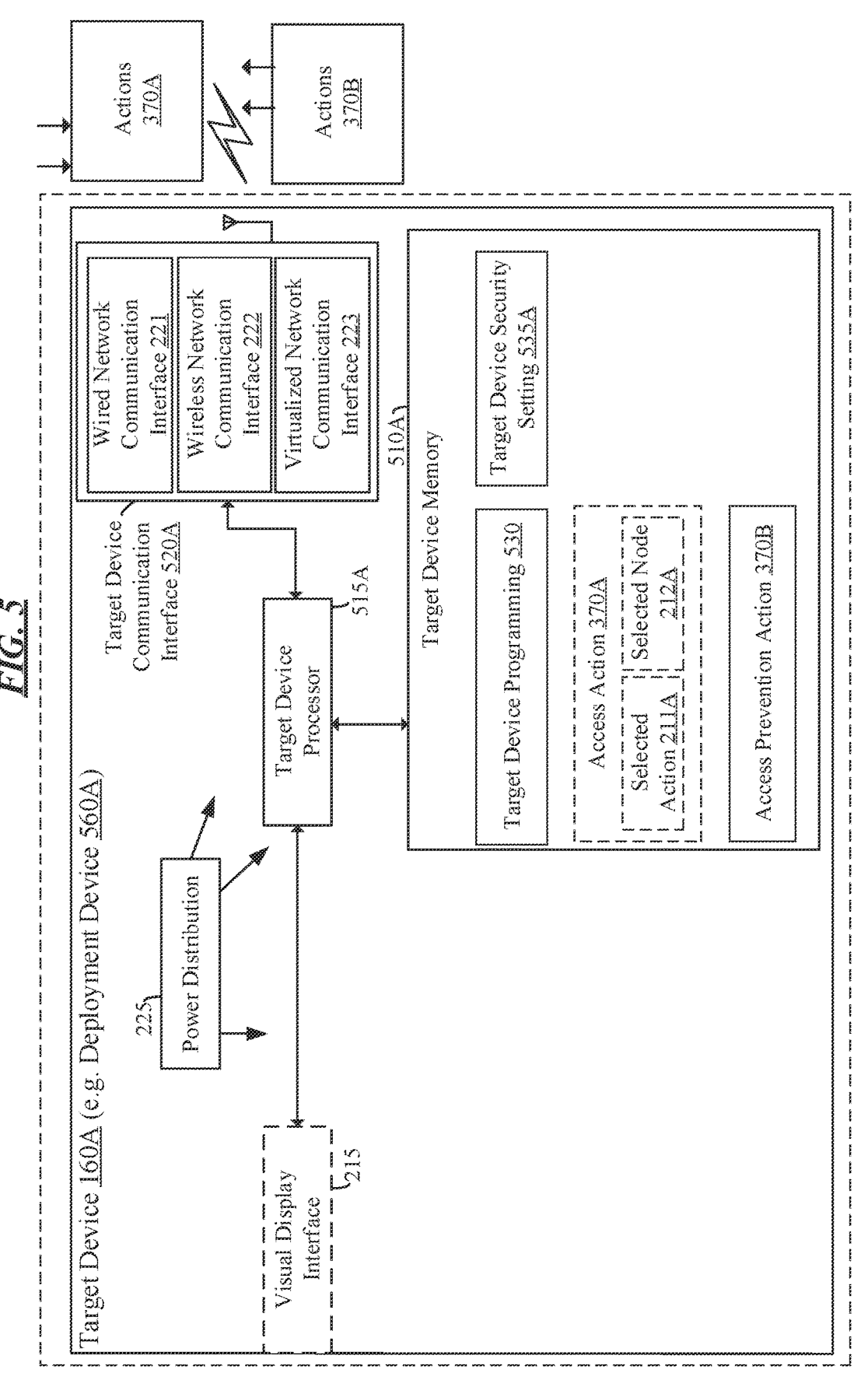
FIG. 5 is a block diagram of a target device, or a deployment device, of the search agent training system.
Figure 6:
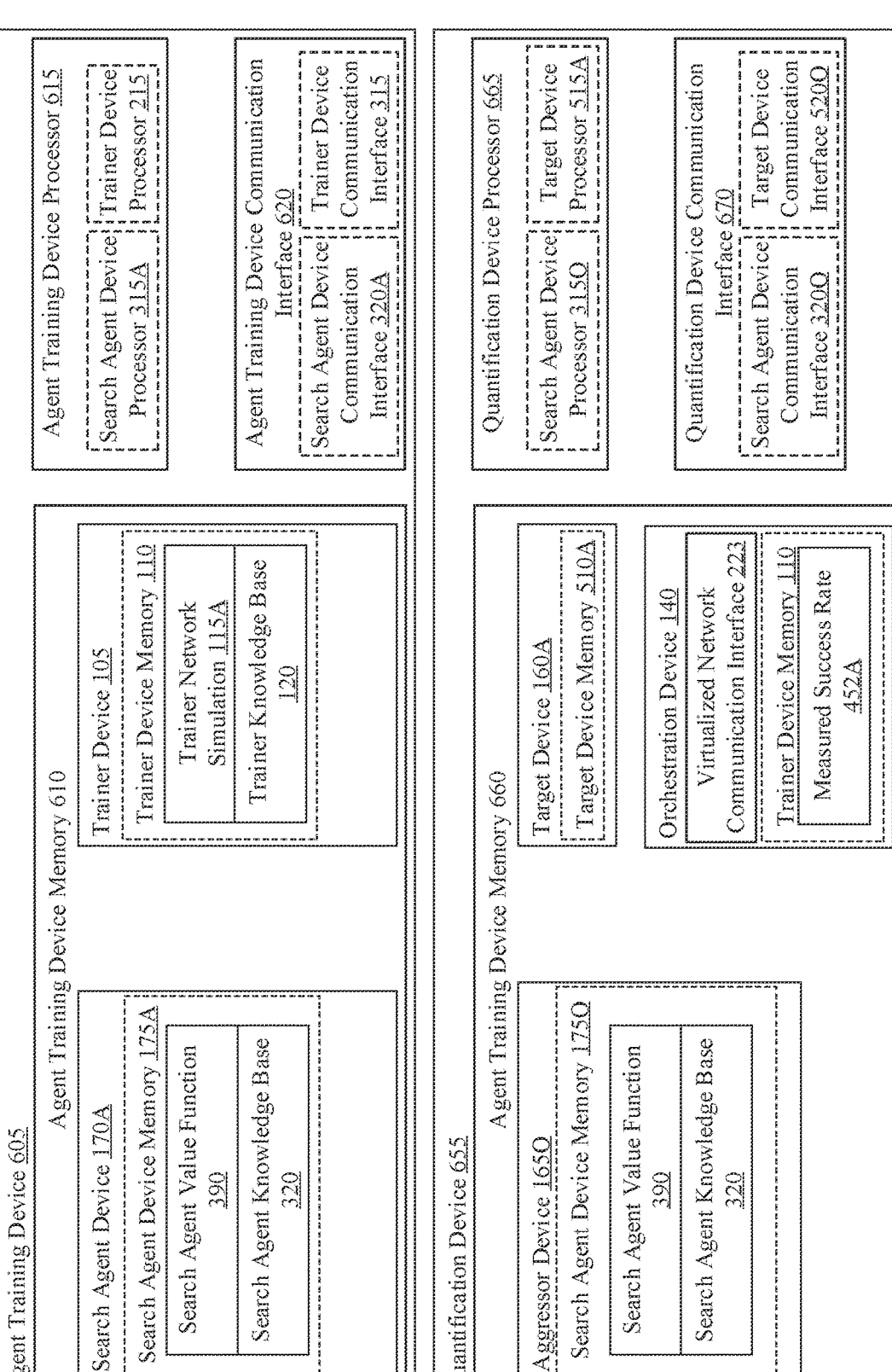
FIG. 6 is a high-level functional block diagram of an agent training device virtually implementing a search agent device and trainer device, as well as a quantification device virtually implementing an aggressor device, target device, and orchestrator device of the search agent training system.

Trainer device communication interface 220 of FIG. 2, search agent device network communication interface 320A of FIG. 3, aggressor device network communication interface 320A of FIG. 3, orchestrator device communication interface 420 of FIG. 4, target device communication interface system 520A of FIG. 5, agent training device communication interface 620 of FIG. 6, and quantification device communication interface 670 of FIG. 6 allow for data communication (e.g., wired or wireless) over various networks. Communication interface systems 220, 320A, 420, 520A, 620, 670 can include at least one radio frequency (RF) transceiver wireless network communication interface 222, for example, a single-band, dual-band, or tri-band chipset of RF transceiver(s) configured for wireless communication via separate radios that operate at three different frequencies, such as sub-GHz (e.g., 900 MHz), Bluetooth Low Energy (BLE) (2.4 GHz), and 5 GHz, for example. Communication interface systems 220, 320A, 420, 520A, 620, 670 10 can communicate over a secondary wired network connection (e.g., wired or wireless LAN) via the wired network communication interface 221. If the trainer device 105, search agent device 170A, aggressor device 165A, orchestrator device 150, or target device 160A is implemented as a virtual machine, then a virtualized network communication interface 223 may be used, which appears to the respective virtualized trainer device 105, search agent device 170A, aggressor device 165A, orchestrator device 150, or target device 160A as a functioning network communication interface. In actuality, the virtualized network communication interface 223 communicates either with another device within the same physical memory in which the respective virtual trainer device 105, search agent device 170A, aggressor device 165A, orchestrator device 150, or target device 160A resides, or utilizes the communication interface of the physical device hosting the respective virtualized trainer device 105, search agent device 170A, aggressor device 165A, orchestrator device 150, or target device 160A.

Trainer device processor 215 of FIG. 2, search agent device processor 315A of FIG. 3, aggressor device processor 315A of FIG. 3, orchestrator device processor 415 of FIG. 4, target device processor 515A of FIG. 5, agent training device processor 615 of FIG. 6, and quantification device processor 665 of FIG. 6 serve to perform various operations, for example, in accordance with instructions or programming executable by processors 215, 315A, 415, 515A, 615, 665. For example, such operations may include operations related to communications with various search agent training system 100 elements, such as trainer device 105, quantification system 140, and search agent device 170A to implement the trainer network simulation session sequence 900 of FIG. 9, the quantification system probability computation protocol 100, and the search agent selection method 1100. Although a processor 215, 315A, 415, 515A, 615, 665 may be configured by use of hardwired logic, typical processors are general processing circuits configured by execution of programming. Processors 215, 315A, 415, 515A, 615, 665 include elements structured and arranged to perform one or more processing functions, typically various data processing functions. Although discrete logic components could be used, the examples utilize components forming a programmable CPU. A processor 215, 315A, 415, 515A, 615, 665 for example includes one or more integrated circuit (IC) chips incorporating the electronic elements to perform the functions of the CPU. The processor 215, 315A, 415, 515A, 615, 665 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware. Although the illustrated examples of the processors 215, 315A, 415, 515A, 615, 665 include only one microprocessor, for convenience, a multi-processor architecture can also be used. A digital signal processor (DSP) or field-programmable gate array (FPGA) could be suitable replacements for the processors 130, 215, 315A, 415, 515A, 615, 665 but may consume more power with added complexity. If the trainer device 105, search agent device 170A, aggressor device 165A, orchestrator device 150, or target device 160A is implemented as a virtual machine, then a virtualized processor 130, 215, 315A, 415, 515A, 615, 665 may be used, which appears to the respective virtualized trainer device 105, search agent device 170A, aggressor device 165A, orchestrator device 150, or target device 160A as a functioning processor. In actuality, the virtualized processor 130, 215, 315A, 415, 515A, 615, 665 is implemented by the processor of the physical device hosting the respective virtualized trainer device 105, search agent device 170A, aggressor device 165A, orchestrator device 150, or target device 160A.

Trainer device memory 110 of FIG. 2, search agent device memory 175A of FIG. 3, aggressor device memory 175A of FIG. 3, orchestrator device memory 410 of FIG. 4, target device memory 510A of FIG. 5, agent training device memory 610 of FIG. 6, and agent training device memory 660 of FIG. 6 are for storing data and programming. In the example, the main memory system 110, 175A, 410, 510A, 610, 660 may include a flash memory (non-volatile or persistent storage) and/or a random access memory (RAM) (volatile storage). The RAM serves as short term storage for instructions and data being handled by the processors 130, 215, 315A, 415, 515A, 615, 66 e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

If the trainer device 105, search agent device 170A, aggressor device 165A, orchestrator device 150, or target device 160A is implemented as a virtual machine, then a virtualized memory 110, 175A, 410, 510A, 610, 660 may be used, which appears to the respective virtualized trainer device 105, search agent device 170A, aggressor device 165A, orchestrator device 150, or target device 160A as a functioning memory. In actuality, the virtualized memory 110, 175A, 410, 510A, 610, 660 is implemented in the memory of the physical device hosting the respective virtualized trainer device 105, search agent device 170A, aggressor device 165A, orchestrator device 150, or target device 160A.

Trainer Device 105 may include, for output purposes, a visual display interface 215, such as a liquid crystal display (LCD) or light emitting diode (LED) screen or the like. This allows a technician operating the trainer device 105, or the search agent training system 100, to view diagnostic data to be used to fine-tune the various elements and devices of the search agent training system 100.

Within the trainer device memory 110 is the trainer device programming 230. This programming stores the instructions the trainer device 105 implements in order to take the actions described throughout.

When the search agent device 170A sends a potential action 171A and a potential node 172A, the search agent device 170A does so by sending an action message 270A, which is stored in the trainer device memory with the selected action 211A to which the sent potential action 171A relates, and the selected node 212A to which the sent potential node relates. After consulting the trainer knowledge base 120 for a resulting action outcome probability value 254A associated with the selected action 211A and selected node 212A, the trainer device 105 has a resulting observation 251A and a resulting reward 252A in response to the potential action 171A and a potential node 172A. The resulting observation 251A includes the success indicator, and the access to a given node granted or restricted based upon the outcome of the potential action 171A. The resulting reward are points, which are granted to the A.I. algorithm implemented within the search agent device 170A. As most search A.I. algorithms are programmed to be motivated by points, the resulting reward 252A is how the search agent device 170A determines if it is doing good work, or bad work. Adjusting the points rewarded to the search agent device 170A for various actions on various nodes can dramatically alter the behavior of the search agent device 170A.

As previously discussed, though only selectable actions 111A-N can generate a well-formed response from the trainer device 105 to the search agent device 170A, the search agent device 170A can conceivably send any string of bits to the trainer device 105 as a message. That string of bits could be formatted as a request for a node count report message 270C or a node identifier report message 270D. A node count report message 270C is any message that reports a count of all of the nodes 112A-N, selectable or hidden, within the trainer network simulation 115A. As an improvement implemented within the search agent training system 100 is variable numbers of nodes 112A-N within a trainer network simulation 115A. The trainer device 105 cannot report the number of nodes 112A-N when requested by the search agent device 170A: that would largely defeat the purpose of variable sized networks, as the variability is largely a hindrance by way of limiting the search agent device 170A in knowing how many total nodes 112A-N there are in the trainer network simulation 115A. In an example, there are a hundred nodes 112A-N in a trainer network simulation 115A, with ninety-four behind one particularly secured node 112F. If finding a hidden node 112F-N is worth one point, and being detected is worth negative ten points, the search agent device 170A may decide that attempting to pass the secured node 112F, resulting in an ultimate potential gain of ninety-five points, is worth the risk of losing negative ten points upon being discovered. In a 50/50 detection scenario, not trying to pass results in five points (the four nodes 112A-E the search agent 170A already rendered selectable), failing results in negative five points (five nodes 112A-E minus the ten point penalty,) and success results in one hundred points (all nodes 112A-N are selectable). The weighted best option is to try to pass the secured node 112F ((100–5)/2=47.5 points) as opposed to simply not attempting (five points). However, if there are only six nodes, with no hidden nodes 112G-N behind the sturdy node 112F, then attempting to pass the secured node 112F statistically results in a poor point outcome (6–5)/2=0.5 points vs
five points.) If the search agent device 170A knows how
many nodes 112A-N are in the trainer network simulation
115A, the solution to this problem is trivial. However, in the
real-world, the network topology is not likely to be known
to a search agent device 170A, and so allowing the search
agent device 170A to be granted this information lowers the
fidelity of the trainer network simulation 115A, and reduces
the overall functionality of the search agent device 170A.

In the same manner, a node identifier report message
270D is any message that requests the identity of any hidden
node 112B,D,F-N within the trainer network simulation
115A. To be able to identify hidden nodes 112B,D,F-N is to
be able to count hidden nodes 112B,D,F-N, and so any
request that inquires essentially "Does a hidden node 112G
exist?" must also be ignored by the trainer device 105.

Not only must these requests be ignored, but any func-
tions in the trainer device programming 230 which might
proactively, or at the request of a third-party device, transmit
a node count report message 270C or a node identifier report
message 270D, must be pre-empted. The trainer device
programming 230 must have a function to screen for any
node count report message 270C or node identifier report
message 270D and prevent their transmission.

This messaging constraint is not to indicate that revealing
network topology cannot be done in the context of the
simulation. For example, if selectable node 112A represents
a network gateway, selectable node 112A likely has a cache
with all of the nodes 112A-N within the trainer network
simulation 115A. The search agent device 170A attempting
to breach that cache is permissible, and (if successful) the
trainer device 105 is permitted to send the contents of that
cache to the search agent device 170A, even though the
contents of the cache would otherwise constitute a node
identifier report message 270D. Information from the trainer
device 105 is presumptively correct (e.g. when the trainer
device 105 responds that an attempted ping returned
"Request timed out", the attempted ping is presumed to not
have actually returned "Reply from Node 112A: bytes 32
time <1 ms TTL=128"), but information from within the
trainer network simulation 115A may be incorrect (e.g. the
contents of the cache from the gateway are extremely stale
and no longer largely accurate.) The search agent device
170A must determine if the contents of resulting observa-
tions 251A are true and accurate.

Trainer device memory 110 in FIG. 2 illustrates that there
are multiple trainer network simulations 115A-N running
concurrently. These trainer network simulations 115A-N
may be running against search agent devices 170A with
completely different configurations, or search agent devices
170A with shared potential action outcome probability val-
ues 173A. Sharing potential action outcome probability
values 173A across multiple search agent devices 170A
allows the underlying A.I. to run against multiple trainer
network simulations 115A-N in parallel, increasing the total
number of simulations, thereby learning faster and ideally
more correct information.

Trainer network simulations 115A-N can include a trainer
session 253A-C. Before a trainer session 253A is initiated,
the search agent device 170A cannot interact with the
training network simulation 115A-N. After the trainer ses-
sion 253A is concluded, the search agent device 170A
cannot interact with the training network simulation **115A-
N. Allowing the trainer network simulation 115A** to exist
while the search agent device 170A cannot interact allows
for setup of the trainer network simulation 115A, and
post-session analysis of the performance of the search agent device 170A as well as the trainer device 105. The trainer
session 253B-C can come in two subtypes: a trainer training
session 253B, and a trainer testing session 253C. A trainer
training session 253B indicates to the search agent device
170A that the primary goal is to learn: the search agent
device 170A may therefore make apparently sub-optimal
decisions in order to learn if the decision is actually optimal.
A trainer testing session 253C indicates to the search agent
device 170A that the primary goal is to test: the search agent
device 170A should make only optimal decisions, in order to
display the effectiveness of the A.I. algorithm within the
search agent device 170A.

The orchestrator device 150, upon determining virtual-
ization testing results, sends those results within an updated
action probability value message 270E—the trainer device
105 updates the associated selectable action outcome prob-
ability values 121A with these results.

FIG. 3 is a block diagram of a search agent device 170A,
or an aggressor device 165A, of the search agent training
system 100. The circuitry, hardware, and software of the
search agent device 170A is similar to the trainer device 105
of FIG. 2, including the power distribution 225, search agent
device processor 315A, search agent device communication
interface 320A, search agent device memory 175A, and
optional visual display interface 215.

The memory of the search agent device memory 175A
includes the search agent device programming 330. This
programming stores the instructions the search agent device
170A implements in order to take the actions described
throughout. The search agent device programming 330
includes a search agent value function 390: When running in
a real-life scenario, or in some trainer testing sessions 253C,
the search agent device 170A will not be granted "points" by
the adversarial network: in such cases, the search agent
device 170A will need to give itself points to keep itself
motivated, proportional to the progress being made in pen-
etration testing. As previously noted, the search agent device
170A selects a potential action 111A as a selected action
211A, and a potential node 112A as a selected node 212A,
based on a potential reward 352A. The potential reward
352A is based on previous resulting rewards 252A received
for the same potential action outcome probability value
321A. The search agent device 170A implements a search
agent knowledge base 320, which function similarly to the
trainer knowledge base 120: search agent knowledge base
320 is distinguishable in that the search agent knowledge
base 320 is informed by result messages 270B, and not by
updated action probability value messages 270E from the
quantification system 140; additionally, the search agent
knowledge base 320 is not presumptively correct.

The search agent device 170A employs a reinforcement
learning approach that uses a neural network model which
can be rolled out to accommodate new states and which
exhibits invariance about potential actions 171A with
respect to new discovered states. The neural network, which
serves as the "brain" of the search agent device 170A, begins
with a small representation of the currently known or
selectable nodes 112A,C in the cyber network under attack.
When a new or hidden node 112B,D-F in that network is
discovered by the search agent device 170A, and thus
becomes a potential target for exploits which enable lateral
movement, the neural network dynamically allocates new
memory space to accommodate the newly discovered, for-
merly hidden node 112B. The set of all theoretical potential
actions 171A per potential node 172A is constant, so the
action space dynamically expands by the number of unique
potential actions 171A for each potential node 172A discovered. The neural network implicitly encodes a policy for taking potential actions 171A in particular states, and that policy can be generalized to a new potential node 172A about which nothing is known. (For example, performing basic reconnaissance actions on the potential node 172A is a good policy to take for any potential node 172A about which little is known.)

The aggressor device 165A is substantially similar to the search agent device 170A, and could be in some cases identical. However, the aggressor device 165A needs to perform exploitative actions, and so can perform access actions 370A: these still include a selected action 211A and a selected node 212A, but the action is performed rather than simulated. The aggressor device 165A may not require much of the A.I. programming, including the search agent device programming 330. As the aggressor device 165A is designed to apply exploits, the aggressor device 165A does not need to decide which action to take on what device: the orchestrator device 150 will, for example, direct the aggressor agent 165A to perform a Rainbow Table Attack against the target device 160A: the aggressor device 165A at most decides how to implement the Rainbow Table Attack; the aggressor device 165A does not decide whether or where to implement what attack.

If the search agent device 170A is designed to ultimately perform a penetration test on a real-life cyber network, then the search agent device 170A will also be capable of performing access actions 370A. However, if the search agent device 170A is used only for training purposes, then the search agent device 170A does not need to be able to actually perform the selected action 211A. This is a substantial decision, as certain exploits (e.g. a Denial of Service Attack) can require massive processing and network resources: a distributed Denial of Service (DDoS) attack can require millions of computers to effectively execute. By simulating these involved attacks, the search agent device 170A can be run on a relatively low-power computing device. The search agent device 170A may implement a model-free Q-learning agent.

FIG. 4 is a block diagram of an orchestrator device 150 of the search agent training system 100. The circuitry, hardware, and software of the orchestrator device 150 is similar to the trainer device 105 of FIG. 2, including the power distribution 225, orchestrator device processor 415, orchestrator device communication interface 420, orchestrator device memory 410, and optional visual display interface 215.

The orchestrator device 150 tasks the aggressor device 165A with attacking the target device 160A with various exploitative access action 370A. The orchestrator device 150 oversees the attempt, and records the measured success 450 of a given attempt: tracking the access action 370A, the target device profile 451A (a description of the target device 160A, often including a description of the target device processor 515A, target device communication interface 520A, target device memory 510A as seen in FIG. 5, as well as factors such as operating system and available memory), and the access obtained 453A, if any, by the aggressor device 165A. After multiple iterations with the same access action 370A against a target device 165A with the same target device profile 451A, an aggregated result can be collected as a measured success rate 452A. This measured success rate is sent within an updated action probability value message 270E to the trainer device 110, which is utilized to update the trainer knowledge base 120.

The orchestrator device 150 provides the ability to put the target device 160A in various states (processes running, memory usage, etc.). The orchestrator device 150 then provides feedback as to whether the exploit access action 370A was successful and persists the target device state 160A and exploit access action 370A success to calculate the probability distribution of exploit success given the target state or profile 451A as the measured success rate 452A.

FIG. 5 is a block diagram of a target device 160A, or a deployment device 560A, of the search agent training system 100. The circuitry, hardware, and software of the target device 160A is similar to the trainer device 105 of FIG. 2, including the power distribution 225, target device processor 515A, target device communication interface 520A, target device memory 510A, and optional visual display interface 215.

The target device 160A is the recipient of the exploit access actions 370A of the aggressor device 165A. The target device 160A attempts to rebuff these access actions 370A, and reports to the orchestrator device 150 regarding what access or data the target device 160A believes the aggressor device 165A acquired. There can be a discrepancy between what the aggressor device 165A believes it gained, and the target device 160A believes it lost: If the aggressor device 165A has gained more than the target device believes it lost, then the exploit is relatively hard to detect. However, of the aggressor device 165A believe it has gained more than the target device lost, then the exploit is relatively risky.

The target device 160A has target device security settings 535A, which the aggressor device 165A must overcome or comply with. In this context, complying with a target device security setting 535A means following the rule as implemented, and not necessarily as intended. For example, a security setting 535A indicating "Files are only visible to authenticated users" is implemented as "Files may be accessed by devices with a MAC address stored in memory with an Admin flag set to true"—this can be circumvented in several ways, for example by manipulating the memory of the target device 160A to insert a record of the aggressor device 165A MAC address with an Admin flag set to true. Doing so would grant access to the files, and follow the rule as implemented, but would not follow the rule as intended, which would likely indicate "only administrative employees of the company which owns this target device 160A may access the files."

A deployment device 560A is a device in the real-world against which the search agent device 170A is ultimately deployed. To facilitate an effective search agent device 170A, the target device 160A must be as similar as possible to the deployment device 560A that will eventually oppose the search agent device 170A.

FIG. 6 is a high-level functional block diagram of an agent training device 605 virtually implementing a search agent device 170A and trainer device 105, as well as a quantification device 655 virtually implementing an aggressor device 1650, target device 160A, and orchestrator device 140 of the search agent training system 100. The search agent training system 100 is divided between two physical machines: the agent training device 605 and the quantification device 655. This example of virtualization has the benefit of placing the aggressor device 1650 and the target device 160A on the same physical machine: These two devices can potentially require massive resources, simulating multiple aggressor devices 1650 and target devices 160A to determine the statistical likelihood of a given exploit succeed or failing. Alternatively, as the search agent device 170A and trainer device 105 are simulation devices, their processing and memory needs can be substantially lower, but more consistent. The quantification device 655 may be used more sporadically, as exploits become known, whereas
the agent training device 605 may be constantly training
search agent devices 170A based on a variety of cyber
network scenarios.

Figure 7:
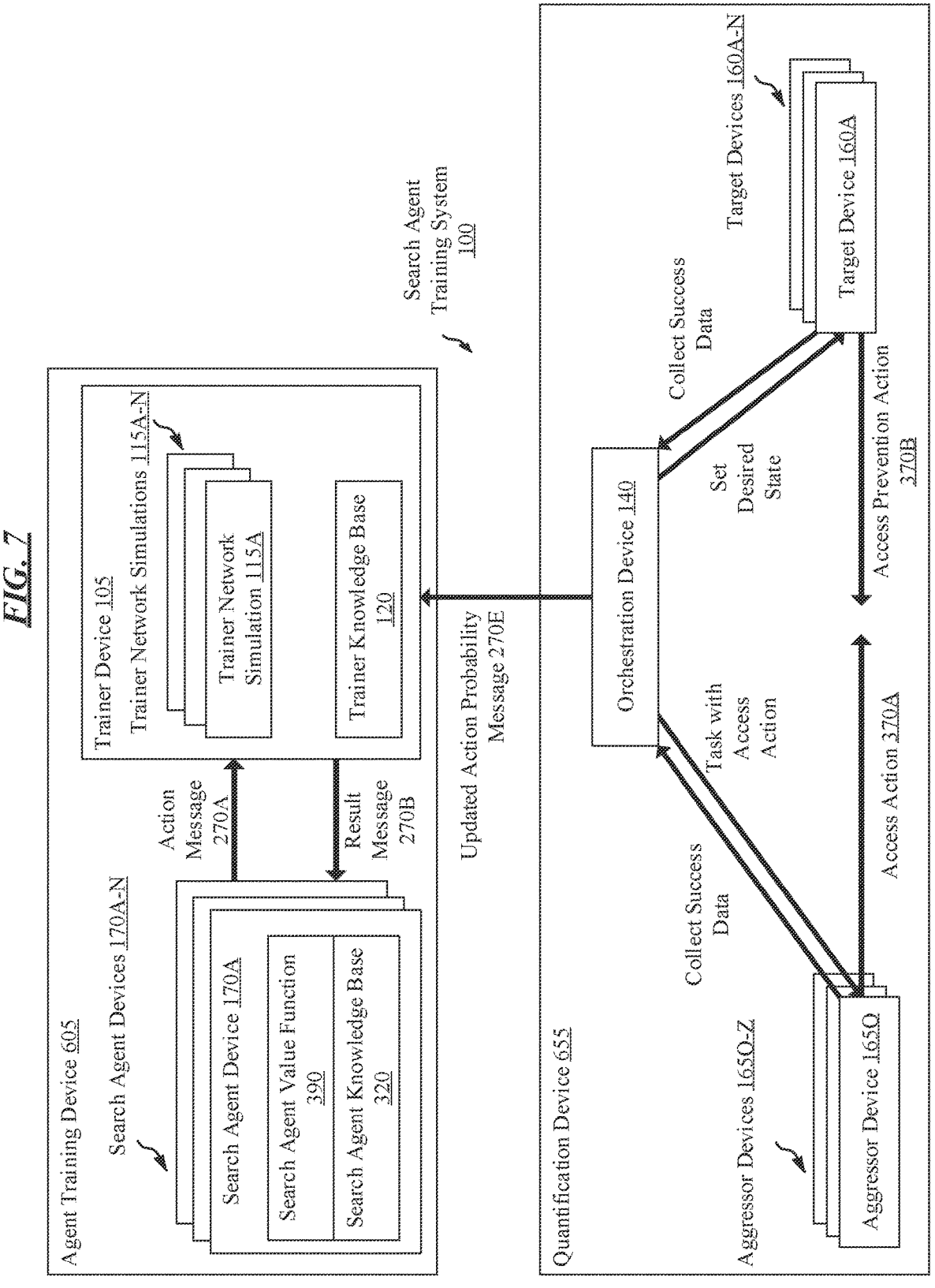
FIG. 7 is a high-level functional block diagram of an agent training device with multiple virtualized search agent devices engaging with multiple trainer network simulations within a virtualized trainer device, as well as a quantification device with a virtual orchestrator device orchestrating multiple virtualized aggressor devices performing access actions against multiple virtualized target devices of the search agent training system.

FIG. 7 is a high-level functional block diagram of an
agent training device 605 with multiple virtualized search
agent devices 170A-N engaging with multiple trainer net-
work simulations 115A-N within a virtualized trainer device
105, as well as a quantification device 655 with a virtual
orchestrator device 140 orchestrating multiple virtualized
aggressor devices 1990-Z performing access actions against
multiple virtualized target devices 160A-N of the search
agent training system 100.

The multiple virtualized search agent devices 170A-N are
paired to and running on multiple trainer network simula-
tions 115A-N on a single trainer device. The search agent
devices 170A-N share a common search agent knowledge
base 320 and search agent value function 390—ensuring that
the parallel trainer network simulations 115A-N generate a
cohesive result.

The multiple virtualized aggressor devices 1650-Z are
paired to and running against multiple target devices
160A-N at the direction of a single orchestrator device 140.
A single orchestrator device 140 is used to aggregate the
results from the parallel exploit attempts by the aggressor
devices 1650-Z against the target devices 160A-N to gen-
erate more accurate measured success rates 452A.

As described herein, a search agent training system 100
includes a trainer device 105. The trainer device 105
includes a trainer device processor 215 and a trainer device
communication interface 220. The trainer device communi-
cation interface 220 is configured for data communication
with a search agent device 170A, and is coupled to the
trainer device processor 215. The trainer device 105 further
includes a trainer device memory 110, coupled to the trainer
device processor 215 of the trainer device 105. The trainer
device memory 110 includes a trainer network simulation
115A, which further includes: at least one selectable action
111A-N, at least one selectable node 112A-N, and a trainer
knowledge base 120, which further includes at least one
selectable action outcome probability value 121A-N. The at
least one selectable action outcome probability value 121A
is associated with at least one selectable action 111A and at
least one selectable node 112A. The trainer device memory
further includes trainer device programming 230 in the
trainer device memory 110. Execution of the trainer device
programming 230 by the trainer device processor 215 of the
trainer device 105 configures the trainer device 105 to
implement the following functions. First, to receive an
incoming action message 270A from the search agent device
170A, the incoming action message 270A including a
selected action 211A of the at least one selectable action
111A-N and a selected node 212A of the at least one
selectable node 112A-N. Second, to determine, based upon
the selected action 211A and the selected node 212A, a
resulting action outcome probability value 254A from the at
least one selectable action outcome probability value
121A-N associated with the selected action 211A and the
selected node 212A. Third, to determine, based upon: the
resulting action outcome probability value 254A, the
selected action 211A, and the selected node 212A, a result-
ing observation 251A and a resulting reward 252A. Fourth,
to send an outgoing result message 270B to the search agent
device 170A, the outgoing result message 270B including
the resulting observation 251A and the resulting reward
252A. Fifth, to block a node count report message 270C to
the search agent device 170A from the trainer device 105.

Additionally, execution of the trainer device program-
ming 230 by the trainer device processor 105 further con-
figures the trainer device 105 to implement the following
functions. First, to add an additional selectable node 112A to
the trainer network simulation 115A. Second, to remove a
superfluous selectable node 112C from the trainer network
simulation 115A.

Third, to initiate a trainer session 253A. Fourth, to add an
additional selectable node 112A to the trainer network
simulation 115A during the trainer session 253A. Fifth, to
remove a superfluous selectable node 112C from the trainer
network simulation 115A during the trainer session 253A.
Sixth, to conclude the trainer session 253A. Seventh, to
prevent adding an additional selectable node 112A to the
trainer network simulation during the trainer session. Eighth,
to prevent removing a superfluous selectable node 112C
from the trainer network simulation 115A during the trainer
session 253A. Ninth, to block a node identifier report
message 270D to the search agent device 170A from the
trainer device 105.

Further, the search agent training system 100 includes a
quantification system 140 which includes an orchestrator
device 150. The orchestrator device 150 includes an orches-
trator device processor 415 and an orchestrator device
communication interface 420. The orchestrator device 150 is
configured for data communication with the trainer device
105 and is coupled to the orchestrator processor 415. The
orchestrator device 150 further includes an orchestrator
device memory 410, coupled to the orchestrator device
processor 415 of the orchestrator device 150. The orches-
trator device 150 includes orchestrator device programming
430. The quantification system 140 further includes a target
device 160A. The target device 160A includes a target
device processor 515A and a target device communication
interface 520A. The target device communication interface
520A is configured for data communication with the orches-
trator device 150 and is coupled to the target device pro-
cessor 515A. The target device 160A further includes a
target device memory 510A, coupled to the target device
processor 515A of the target device 160A and includes target
device programming 530 and at least one target device
security setting 535. The quantification system 140 addi-
tionally includes an aggressor device 165A. The aggressor
device 165A includes an aggressor device processor 315A
and an aggressor device communication interface 320A. The
aggressor device communication interface 320A is config-
ured for data communication with the orchestrator device
150 and the target device 160A, and is coupled to the
aggressor device processor 315A. The aggressor device
165A further includes an aggressor device memory 175A,
coupled to the aggressor device processor 315A of the
aggressor device 165A, including aggressor device pro-
gramming 330. One or more of: the target device processor
515A, the target device communication interface 520A, the
target device memory 510A, the target device programming
530, or a combination thereof, constitute a target device
profile 451A. Execution of the aggressor device program-
ming 330 by the aggressor device processor 315A of the
aggressor device 165A configures the aggressor device
165A to implement the following functions. First, to perform
an access action 370A, the access action 370A accessing the
target device processor 515A, target device communication
interface 520A, or target device memory 510A in compli-
ance with the target device security settings 535A. Execu-
tion of the target device programming 530 by the target
device processor 515A of the target device 160A configures
the target device 160A to implement the following functions.

First, to prevent access to the target device processor 515A, target device communication interface 520A, or target device memory 510A by the aggressor device 165A in compliance with the target device security settings 535A. Execution of the orchestrator device programming 430 by the orchestrator device processor 415 of the orchestrator device 150 configures the orchestrator device 150 to implement the following functions. First, to measure success 450A of the aggressor device 165A in accessing the target device processor 515A, target device communication interface 520A, or target device memory 510A, based upon the access action 370A performed by the aggressor device 165A, and the target device profile 451A. Second, to aggregate the measured success 450A of the aggressor device 165A to determine a measured success rate 452A, based upon the success of the aggressor device 165A, the access action 370A, and the target device profile 451A. Third, to transmit an updated action outcome probability value message 270E to the trainer device 105, the updated action outcome probability value message 270E including the measured success rate 452A, the access action 370A, and the target device profile 451A.

Additionally, execution of the orchestrator device programming 430 by the orchestrator device processor 415 of the orchestrator device 150 further configures the orchestrator device 150 to implement the following functions. First, to measure the success of the aggressor device 165A, as well as access obtained 453A by the aggressor device 165A in accessing the target device processor 515A, target device communication interface 520A, or target device memory 510A, based upon the access action 370A performed by the aggressor device 165A, and the target device profile 451A. Second, to aggregate the measured success 450A of the aggressor device 165A to determine the measured success rate 452A, based upon the success of the aggressor device 165A, the access obtained 453A by the aggressor device 165A, the access action 370A, and the target device profile 451A. Third, to transmit the updated action outcome probability value message 270E to the trainer device 105, the updated action outcome probability value message 270E including the measured success rate 452A, the access obtained by the aggressor device 453A, the access action 370A, and the target device profile 451A.

In some examples, the aggressor device 165A is a computing device configured for penetration testing a computing device on a network. The target device 160A is a computing device configured as a computing device on a network. The access actions 370A are exploitation functions, designed to exploit a computing device on a network. The aggressor device 165A performs penetration testing by running exploitation functions against the target device 160A in an attempt to obtain access to or control over the target device 160A.

In some examples, the orchestrator device 150 is an orchestrator virtual machine device. The aggressor device 165A is an aggressor virtual machine device. The target device 160A is a target virtual machine device. The quantification system 140 further includes a physical quantification device 655, including a quantification device processor 665, a quantification device communication interface 670, configured for data communication with the trainer device 105, coupled to the quantification device processor 665, and a quantification device memory 660, coupled to the quantification device processor 665. The orchestrator virtual machine device, the aggressor virtual machine device, and the target virtual machine device, are implemented as functions to be executed by the physical quantification device 655.

In some examples, the trainer device 105 is a trainer virtual machine device. The search agent device 170A is a search agent virtual machine device. The search agent training system 100 further includes a physical agent training device 605, including an agent training device processor 615, an agent training device communication interface 620, configured for data communication with the orchestrator device 140, and an agent training device memory 610 coupled to the agent training device processor 615. The trainer virtual machine device and the search agent virtual machine device, are implemented as functions to be executed by the physical agent training device 605.

Additionally, the search agent training system 100 includes a search agent device 170A including a search agent device processor 315A and a search agent device communication interface 320A. The search agent device communication interface 320A is configured for data communication with the deployment device 560A and is coupled to the search agent device processor 315A. The search agent device 170A further includes a search agent device memory 175A, coupled to the search agent device processor 315A of the search agent device 170A and configured to accept a variable amount of at least one potential node 112A. The search agent device memory 175A includes at least one potential action 111A, the at least one potential node 112A, and a search agent knowledge base 320, which further includes at least one potential action outcome probability value 321A-N, the at least one potential action probability value 321A associated with at least one potential action 111A, the at least one potential node 112A and a potential reward 352A. The search agent device memory 175A further includes search agent device programming 330 in the search agent device memory 175A. Execution of the search agent device programming 330 by the search agent device processor 315A of the search agent device 170A configures the search agent device 170A to implement the following functions: First, to select a selected action 211A of the at least one potential action 111A and a selected node 212A of the at least one potential node 112A based upon the at least one potential action outcome probability value 321A. Second, to transmit an outgoing action message 270A to the deployment device 560A, the outgoing action message 270A including the selected action 211A and the selected node 212A. Third, to receive an incoming result message 270B from the deployment device 560A, the incoming result message 270B including a resulting observation 251A. Fourth, to determine a resulting reward 252A based upon the resulting observation 251A. Fifth, to record the resulting at least one potential action outcome probability value 321A and potential reward 352A associated with the potential action 111A and the potential node 112A, based upon the resulting observation 251A and the resulting reward 252A.

Further, the search agent device memory 175A further includes a search agent knowledge base 320, which includes at least one potential action outcome probability value 321A-N, the at least one potential action probability value 321A associated with at least one potential action 111A, the at least one potential node 112A and a potential reward 352A. Execution of the search agent device programming by the search agent device processor of the search agent device further configures the search agent device to implement the following functions. First, to select the selected action 211A and the selected node 212A based upon the at least one potential action outcome probability value 321A. Second, to record the resulting at least one potential action outcome probability value 354A and potential reward 352A associated with the potential action 111A and the potential node 112A, based upon the resulting observation 251A and the resulting reward 252A.

The search agent device memory 175A is configured to accept a variable amount of the at least one potential node 112A. Because the amount on nodes 112A-N within the trainer network simulation 115A may vary, the capacity of the search agent device memory 175A needs to vary proportionally.

In some examples, execution of the trainer device programming 230 by the trainer device processor 215 further configures the trainer device 105 to implement the following functions. First, to initiate a trainer training session 253B. Second, to conclude the trainer training session 253B. Third, to initiate a trainer testing session 253C. Fourth, to conclude the trainer testing session 253C. Execution of the search agent device programming 330 by the search agent device processor 315A of the search agent device 170A further configures the search agent device 170A to implement the following functions. First, during the trainer training session 253B, to randomly select between performing a random potential action 111B on a random potential node 112B, and performing an ideal potential action 111A on an ideal potential node 111A, the ideal potential action 111A and the ideal potential node 112A associated with the highest potential action outcome probability value 321A of the at least one potential action outcome probability value 321A-N.

In some particular examples, the function to select the selected action 211A and the selected node 212A based upon the at least one potential action outcome probability value 321A includes, first, determining a current state of all potential nodes 112A. Second, determining all possible proposals, a possible proposal including a pairing of a possible potential node 112A and a possible potential action 111A. Third, grouping the possible proposals by the current state of the possible potential node 112A of the pairing of the possible proposal and the possible potential action 111A of the possible proposal. Fourth, calculating the proposal value of each group of possible proposals, based upon a shared current state of each possible potential node 112A within a respective group of possible proposals, and based upon a shared possible potential action 111A of the respective group of possible proposals. Fifth, applying the proposal value of the respective group to each pairing of a respective possible potential node 112A and a respective possible potential action 111A. Sixth, selecting the selected action 211A and the selected node 212A based upon the proposal value associated with the selected action 211A and the selected node 212A.

In certain examples, the search agent training system further comprises a visual display interface 215, wherein the visual display interface is configured to display a performance report of the resulting reward 252A of the search agent device 170A.

In some examples, a trainer knowledge base 320 including potential action outcome probability values 321A-N is produced by first, receiving an incoming action message 270A from the search agent device 170A, the incoming action message 270A including a selected action 211A of the at least one selectable action 111A-N and a selected node 212A of the at least one selectable node 112A-N. Second, by determining, based upon the selected action 211A and the selected node 212A, a resulting action outcome probability value 254A from the at least one selectable action outcome probability value 121A-N associated with the selected action 211A and the selected node 212A. Third, by determining, based upon: the resulting action outcome probability value 254A, the selected action 211A, and the selected node 212A, a resulting observation 251A and a resulting reward 252A. Fourth, by sending an outgoing result message 270B to the search agent device 170A, the outgoing result message 270B including the resulting observation 251A and the resulting reward 252A. Fifth, by updating the potential action outcome probability values 321A-N based upon the selected action 211A, the selected node 212A, the resulting observation 251A, the resulting reward 252A, or a combination thereof.

In further examples, a trainer knowledge base 320 including potential action outcome probability values 321A-N is produced by further attempting to perform an access action 370A, the access action 370A accessing the target device processor 515A, target device communication interface 520A, or target device memory 510A in compliance with the target device security settings 535A. By attempting to prevent access to the target device processor 515A, target device communication interface 520A, or target device memory 510A by the aggressor device 165A in compliance with the target device security settings 535A. By measuring success 450A of the aggressor device 165A in accessing the target device processor 515A, target device communication interface 520A, or target device memory 510A, based upon the access action 370A performed by the aggressor device 165A, and the target device profile 451A. Then, by aggregating the measured success 450A of the aggressor device 165A to determine a measured success rate 452A, based upon the success of the aggressor device 165A, the access action 370A, and the target device profile 451A. Next, by updating the potential action outcome probability values 321A-N based upon the measured success rate 452A, the access action 370A, the target device profile 451A, or a combination thereof.

FIGS. 8A-D are block network diagrams depicting selectable and hidden nodes within a network simulation as a search agent device attempts to traverse the network simulation of the search agent training system.

Figure 8B:
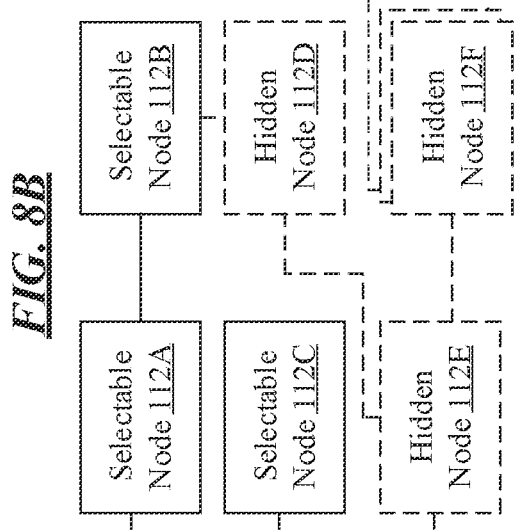
FIGS. 8A-D are block network diagrams depicting selectable and hidden nodes within a network simulation as a search agent device attempts to traverse the network simulation of the search agent training system.
Figure 8D:
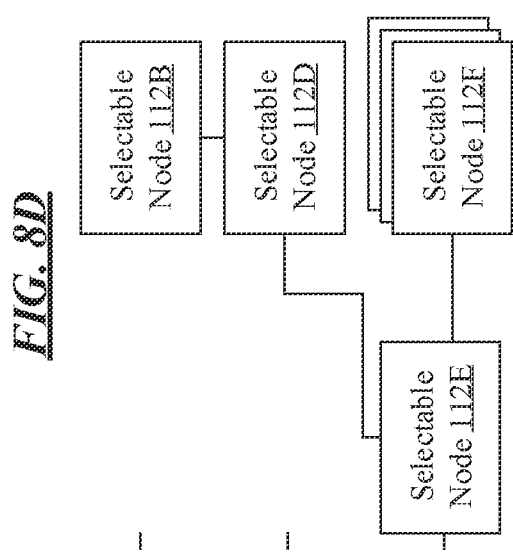
Figure 8A:
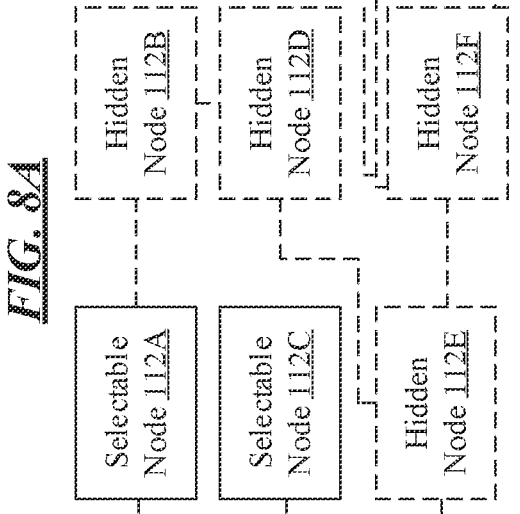

In FIG. 8A there are two selectable nodes 112A,C, and four hidden nodes 112B,D,F. A large number of easy-to-breach hidden nodes 112G-N are behind hidden node 112F. The search agent device 170A may only attempt to exploit the selectable nodes 112A,C, which are selectable because in this example they have a simulated direct connection to the internet. The search agent 170A is only aware of selectable nodes 112A,C.

In FIG. 8B, the search agent device 170A breached selectable node 112A using a selected action 211A. The resulting observation 251A is that selectable node 112A grants potential access to hidden node 112B, making hidden node 112B into selectable node 112B. The search agent 170A is only aware of selectable nodes 112A,B,C.

Figure 8C:
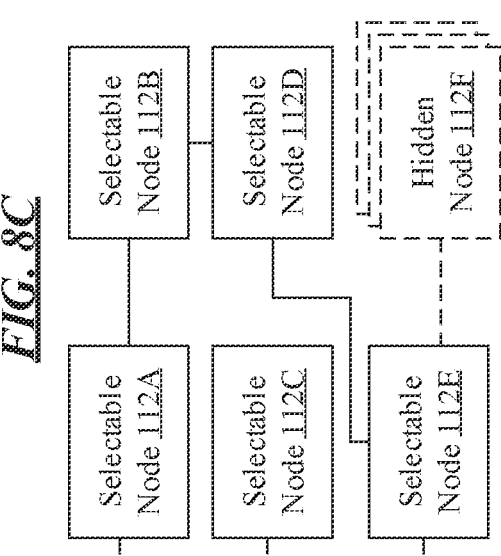

In FIG. 8C, the search agent device 170A has breached selectable node 112B and hidden node 112D, making hidden node 112D into selectable node 112D. Additionally, selectable node 112D has revealed hidden node 112E, making hidden node 112E into selectable node 112E. The search agent is only aware of selectable nodes 112A,B,C,D,E.

In FIG. 8D, selectable nodes 112A and 112C have gone offline—removed by the trainer network simulation 115A, simulating a power down due to suspicious behavior. The search agent device 170A may record this fact, and further may conclude that nodes 112B and 112D may also go offline soon as well. However, newly-selectable node 112E has an access point to the internet, and the search agent device 170A can exploit that in order to connect to the cyber network and take control of selectable node 112E. The search agent is still aware of selectable nodes 112A,C, but is also aware that they are no longer online. Finally, the search agent device 170A has located hidden node 112F, making the hidden node 112F into selectable node 112F. Search agent device 170A exploits the remaining visible selectable node 112F, and then rapidly exploits the remaining nodes 112G-N in the network behind selectable node 112F.

FIG. 9 is a flowchart diagramming of a trainer network simulation session sequence 900 of the search agent training system 100. Beginning in step 908, the trainer network simulation session sequence 900 includes initiating a trainer session 253A. Moving to step 916, the trainer network simulation session sequence 900 further includes selecting the potential action 111A and the potential node 112A based upon the at least one potential action outcome probability value 321A. Continuing to step 924, the trainer network simulation session sequence 900 further includes transmitting an outgoing action message 270A to the trainer device 105, the outgoing action message 270 including a selected action 211A of the at least one potential action 111A and a selected node 212A of the at least one potential node 112A.

In step 932, the trainer network simulation session sequence 900 includes receiving an incoming action message 270A from the search agent device 170A. Moving to step 940, the trainer network simulation session sequence 900 includes determining a resulting action outcome probability value 254A from at least one selectable action outcome probability value 121A-N. Continuing to step 948, the trainer network simulation session sequence 900 includes determining a resulting observation 251A and a resulting reward 252A. Additionally, in step 956, the trainer network simulation session sequence 900 can include adding an additional selectable node 112A to the trainer network simulation. Moving to step 964, the trainer network simulation session sequence 900 can include removing a superfluous selectable node 112E from the trainer network simulation. Continuing to step 972, the trainer network simulation session sequence 900 includes sending an outgoing result message 270B to the search agent device 170A.

In step 980, the trainer network simulation session sequence 900 includes receiving an incoming result message 270B from the trainer device 105. Moving to step 988, the trainer network simulation session sequence 900 includes recording the resulting at least one potential action outcome probability value 321A and potential reward 352A associated with the potential action 11A and the potential node 112A, based upon the resulting observation 251A and the resulting reward 252A. At this point, the trainer network simulation session sequence 900 can loop back up to step 916 and allow the search agent device 170A to attempt another round of actions. Alternatively, in step 996, the trainer network simulation session sequence 900 includes concluding the trainer session.

FIG. 10 is a flowchart diagramming of a quantification system probability computation protocol 1000 of the quantification system 140. Beginning in step 1010, the quantification system probability computation protocol 1000 includes orchestrating a measurement session 1010, which is the period of time during which the aggressor device 165A may attempt to exploit the target device 160A. Continuing in step 1020, the quantification system probability computation protocol 1000 includes performing an access action 370A, the access action 370A accessing the target device processor 515A, target device communication interface 520A, or target device memory 510A in compliance with the target device security settings 535A. Almost simultaneously in step 1030, the quantification system probability computation protocol 1000 includes preventing access to the target device processor 515A, target device communication interface 520A, or target device memory 510A by the aggressor device in compliance with the target device security settings 535A. Moving on to step 1040, the quantification system probability computation protocol 1000 includes measuring success 450A of the aggressor device 165A in accessing the target device processor 515A, target device communication interface 520A, or target device memory 510A, based upon the access action 370A performed by the aggressor device 165A, and the target device profile 451A. Continuing to step 1050, the quantification system probability computation protocol 1000 includes aggregating the measured success 450A of the aggressor device 165A to determine a measured success rate 452A, based upon the success of the aggressor device, the access action 370A, and the target device profile 451A. Additionally, in step 1060, the quantification system probability computation protocol 1000 includes transmitting an updated action outcome probability value message 270E to the trainer device 105, the updated action outcome probability value message 270E including the measured success rate 452A, the access action 370A, and the target device profile 451A. Finally, in step 1070, the quantification system probability computation protocol 1000 includes concluding the measurement session.

FIG. 11 is a flowchart diagramming of a search agent selection method 1100 of the search agent device 170A. This search agent selection method 1100 is optimized based on the fact that multiple nodes may nevertheless have the same target device profile 451A—therefore, there is no need to check every potential action 111A against every potential node 112A—rather, only checking every potential action against every target device profile 451A found in any potential node 112A is sufficient.

Beginning in step 1110, the search agent selection method 1100 includes determining a current state of all potential nodes 112A. Moving on to step 1120, the search agent selection method 1100 includes determining all possible proposals, a possible proposal including a pairing of a possible potential node 112A and a possible potential action 111A. Continuing to step 1130, the search agent selection method 1100 includes grouping the possible proposals by the current state of the possible potential node 112A of the pairing of the possible proposal and the possible potential action 111A of the possible proposal. Later, in step 1140, the search agent selection method includes calculating the proposal value of each group of possible proposals, based upon a shared current state of each possible potential node 112A within a respective group of possible proposals, and based upon a shared possible potential action of the respective group of possible proposals.

In step 1150, the search agent selection method 1100 includes applying the proposal value of the respective group to each pairing of a respective possible potential node 112A and a respective possible potential action 111A. Finally, in step 1160, the search agent selection method 1100 includes selecting the proposed action 111A and the proposed node 112A based upon the proposal value associated with the proposed action 11A and the proposed node 112A.

Any of the steps or functionality, e.g., of the trainer network simulation session sequence 900, quantification system probability computation protocol 1000, search agent selection method 1100, trainer device programming 230, search agent device programming 330, aggressor device programming 330, orchestrator device programming 430, and target device programming, described herein can be embodied in programming or one more applications as described previously. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++), procedural programming languages (e.g., C or assembly language), or firmware. In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "containing," "contains,' "having," "has," "with, or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount. As used herein, the terms "substantially" or "approximately" mean the parameter value varies up to ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A search agent training system, comprising:
a trainer device, including:
    a trainer device processor;
    a trainer device communication interface, configured for data communication with a search agent device, coupled to the trainer device processor;
    a trainer device memory, coupled to the trainer device processor of the trainer device, including:
        a trainer network simulation, which further includes:
            at least one selectable action, and
            at least one selectable node; and
        a trainer knowledge base, which further includes at least one selectable action outcome probability value, the at least one selectable action outcome probability value associated with the at least one selectable action and the at least one selectable node; and
    trainer device programming in the trainer device memory;

wherein execution of the trainer device programming by the trainer device processor of the trainer device configures the trainer device to implement functions, including functions to:
receive an incoming action message from the search agent device, the incoming action message including a selected action of the at least one selectable action and a selected node of the at least one selectable node;
determine, based upon the selected action and the selected node, a resulting action outcome probability value from the at least one selectable action outcome probability value associated with the selected action and the selected node;
determine, based upon:
i) the resulting action outcome probability value,
ii) the selected action, and
iii) the selected node,
a resulting observation and a resulting reward;
send an outgoing result message to the search agent device, the outgoing result message including the resulting observation and the resulting reward; and
block a node count report message to the search agent device from the trainer device; and
a quantification system, including:
an orchestrator device, further including:
an orchestrator device processor;
an orchestrator device communication interface, configured for data communication with the trainer device, coupled to the orchestrator device processor; and
an orchestrator device memory, coupled to the orchestrator device processor of the orchestrator device, including orchestrator device programming;
a target device, further including:
a target device processor;
a target device communication interface, configured for data communication with the orchestrator device, coupled to the target device processor; and
a target device memory, coupled to the target device processor of the target device, including target device programming and at least one target device security setting; and
an aggressor device, further including:
an aggressor device processor;
an aggressor device communication interface, configured for data communication with the orchestrator device and the target device, coupled to the aggressor device processor; and
an aggressor device memory, coupled to the aggressor device processor of the aggressor device, including aggressor device programming;
wherein:
one or more of:
i) the target device processor,
ii) the target device communication interface,
iii) the target device memory,
iv) the target device programming, or
v) a combination thereof,
constitute a target device profile;
execution of the aggressor device programming by the aggressor device processor of the aggressor device configures the aggressor device to implement functions, including functions to:
perform an access action, the access action accessing the target device processor, target device communication interface, or target device memory in compliance with the at least one target device security setting;
execution of the target device programming by the target device processor of the target device configures the target device to implement functions, including functions to:
prevent access to the target device processor, target device communication interface, or target device memory by the aggressor device in compliance with the at least one target device security setting; and
execution of the orchestrator device programming by the orchestrator device processor of the orchestrator device configures the orchestrator device to implement functions, including functions to:
measure success of the aggressor device in accessing the target device processor, target device communication interface, or target device memory, based upon the access action performed by the aggressor device, and the target device profile;
aggregate the measured success of the aggressor device to determine a measured success rate, based upon the success of the aggressor device, the access action, and the target device profile; and
transmit an updated action outcome probability value message to the trainer device, the updated action outcome probability value message including the measured success rate, the access action, and the target device profile.
2. The search agent training system of claim 1, wherein:
execution of the trainer device programming by the trainer device processor further configures the trainer device to implement functions, including functions to:
add an additional selectable node to the trainer network simulation; and
remove a superfluous selectable node from the trainer network simulation.
3. The search agent training system of claim 2, wherein:
execution of the trainer device programming by the trainer device processor further configures the trainer device to implement functions, including functions to:
initiate a trainer session;
add an additional selectable node to the trainer network simulation during the trainer session;
remove a superfluous selectable node from the trainer network simulation during the trainer session; and
conclude the trainer session.
4. The search agent training system of claim 2, wherein:
execution of the trainer device programming by the trainer device processor further configures the trainer device to implement functions, including functions to:
initiate a trainer session;
prevent adding an additional selectable node to the trainer network simulation during the trainer session;
prevent removing a superfluous selectable node from the trainer network simulation during the trainer session; and
conclude the trainer session.
5. The search agent training system of claim 1, wherein:
execution of the trainer device programming by the trainer device processor further configures the trainer device to implement functions, including functions to:
block a node identifier report message to the search agent device from the trainer device.

6. The search agent training system of claim 1, wherein:
execution of the orchestrator device programming by the
orchestrator device processor of the orchestrator device
further configures the orchestrator device to implement
functions, including functions to:
  measure the success of the aggressor device, as well as
access obtained by the aggressor device in accessing
the target device processor, target device communi-
cation interface, or target device memory, based
upon the access action performed by the aggressor
device, and the target device profile;
  aggregate the measured success of the aggressor device
to determine the measured success rate, based upon
the success of the aggressor device, the access
obtained by the aggressor device, the access action,
and the target device profile; and
  transmit the updated action outcome probability value
message to the trainer device, the updated action
outcome probability value message including the
measured success rate, the access obtained by the
aggressor device, the access action, and the target
device profile.

7. The search agent training system of claim 1, wherein:
the aggressor device is a computing device configured for
penetration testing a computing device on a network;
the target device is a computing device configured as a
computing device on a network;
the access action is an exploitation function designed to
exploit a computing device on a network; and
the aggressor device performs penetration testing by
running the exploitation function against the target
device in an attempt to obtain access to or control over
the target device.

8. The search agent training system of claim 1, wherein:
the orchestrator device is an orchestrator virtual machine
device;
the aggressor device is an aggressor virtual machine
device;
the target device is a target virtual machine device;
the quantification system further includes a physical quan-
tification device, comprising:
  a quantification device processor,
  a quantification device communication interface, con-
figured for data communication with the trainer
device, coupled to the quantification device proces-
sor, and
  a quantification device memory, coupled to the quan-
tification device processor; and
the orchestrator virtual machine device, the aggressor
virtual machine device, and the target virtual machine
device, are implemented as functions to be executed by
the physical quantification device.

9. The search agent training system of claim 1, wherein:
the trainer device is a trainer virtual machine device;
the search agent device is a search agent virtual machine
device;
the search agent training system further includes a physi-
cal agent training device, comprising:
  an agent training device processor, and
  an agent training device memory, coupled to the agent
training device processor; and
the trainer virtual machine device and the search agent
virtual machine device, are implemented as functions
to be executed by the physical agent training device.

10. The search agent training system of claim 1, wherein:
the search agent device includes:
  a search agent device processor;
  a search agent device communication interface, con-
figured for data communication with the trainer
device, coupled to the search agent device processor;
  a search agent device memory, coupled to the search
agent device processor of the search agent device,
including:
    at least one potential action, where the at least one
potential action is among the at least one select-
able action of the trainer device; and
    at least one potential node, where the at least one
potential node is among the at least one selectable
node of the trainer device; and
  search agent device programming in the search agent
device memory;
wherein execution of the search agent device program-
ming by the search agent device processor of the search
agent device configures the search agent device to
implement functions, including functions to:
  transmit an outgoing action message to the trainer
device, the outgoing action message including a
selected action of the at least one potential action and
a selected node of the at least one potential node; and
  receive an incoming result message from the trainer
device, the incoming result message including the
resulting observation and the resulting reward.

11. The search agent training system of claim 10, wherein:
the search agent device memory further includes a search
agent knowledge base, which includes at least one
potential action outcome probability value, the at least
one potential action outcome probability value associ-
ated with at least one potential action, the at least one
potential node and a potential reward; and
execution of the search agent device programming by the
search agent device processor of the search agent
device further configures the search agent device to
implement functions, including functions to:
  select the selected action and the selected node based
upon the at least one potential action outcome prob-
ability value; and
  record a resulting at least one potential action outcome
probability value and potential reward associated
with the at least one potential action and the at least
one potential node, based upon the resulting obser-
vation and the resulting reward.

12. The search agent training system of claim 10, wherein:
the search agent device memory is configured to accept a
variable amount of the at least one potential node.

13. The search agent training system of claim 10, wherein:
execution of the trainer device programming by the
trainer device processor further configures the trainer
device to implement functions, including functions to:
initiate a trainer training session;
conclude the trainer training session;
initiate a trainer testing session; and
conclude the trainer testing session; and
execution of the search agent device programming by the
search agent device processor of the search agent
device further configures the search agent device to
implement functions, including functions to:
  during the trainer training session, randomly select
between i) performing a random potential action on
a random potential node and ii) performing an ideal
potential action on an ideal potential node, the ideal
potential action and the ideal potential node associ-
ated with a highest potential action outcome prob-
ability value of at least one potential action outcome
probability value.

14. The search agent training system of claim 11, wherein the function to select the selected action and the selected node based upon the at least one potential action outcome probability value includes:

determining a current state of all potential nodes;

determining all possible proposals, a possible proposal including a pairing of a possible potential node and a possible potential action;

grouping the possible proposals by the current state of the possible potential node of the pairing of the possible proposal and the possible potential action of the possible proposal;

calculating a proposal value of each group of possible proposals, based upon a shared current state of each possible potential node within a respective group of possible proposals, and based upon a shared possible potential action of the respective group of possible proposals;

applying the proposal value of the respective group to each pairing of a respective possible potential node and a respective possible potential action; and selecting the selected action and the selected node based upon the proposal value associated with the selected action and the selected node.

15. The search agent training system of claim 1, further comprising a visual display interface, wherein the visual display interface is configured to display a performance report of the resulting reward of the search agent device.

16. A search agent device comprising:

a search agent device processor;

a search agent device communication interface, configured for data communication with a deployment device, coupled to the search agent device processor;

a search agent device memory, coupled to the search agent device processor of the search agent device, configured to accept a variable amount of at least one potential node, and including:

at least one potential action;

the at least one potential node;

a search agent knowledge base, which includes at least one potential action outcome probability value, the at least one potential action outcome probability value associated with the at least one potential action, the at least one potential node and a potential reward; and search agent device programming in the search agent device memory;

wherein execution of the search agent device programming by the search agent device processor of the search agent device configures the search agent device to implement functions, including functions to:

select a selected action of the at least one potential action and a selected node of the at least one potential node based upon the at least one potential action outcome probability value, the selecting including:

determining a current state of all potential nodes from the at least one potential node;

determining all possible proposals, a possible proposal including a pairing of a possible potential node from the at least one potential node and a possible potential action from the at least one potential action;

grouping the possible proposals by the current state of the possible potential node of the pairing of the possible proposal and the possible potential action of the possible proposal;

calculating a proposal value of each group of possible proposals, based upon a shared current state of each possible potential node within a respective group of possible proposals, and based upon a shared possible potential action of the respective group of possible proposals;

applying the proposal value of the respective group to each pairing of a respective possible potential node and a respective possible potential action; and selecting the selected action and the selected node based upon the proposal value associated with the selected action and the selected node;

transmit an outgoing action message to the deployment device, the outgoing action message including the selected action and the selected node;

receive an incoming result message from the deployment device, the incoming result message including a resulting observation;

determine a resulting reward based upon the resulting observation; and record a resulting at least one potential action outcome probability value and potential reward associated with the selected action and the selected node, based upon the resulting observation and the resulting reward.

17. A search agent training system, comprising:

a trainer device, including:

a trainer device processor;

a trainer device communication interface, configured for data communication with a search agent device, coupled to the trainer device processor;

a trainer device memory, coupled to the trainer device processor of the trainer device, including:

a trainer network simulation, which further includes:

at least one selectable action, and at least one selectable node; and a trainer knowledge base including potential action outcome probability values; and trainer device programming in the trainer device memory;

wherein execution of the trainer device programming by the trainer device processor of the trainer device configures the trainer device to implement functions, including functions to:

receive an incoming action message from the search agent device, the incoming action message including a selected action of an at least one selectable action and a selected node of an at least one selectable node;

determine, based upon the selected action and the selected node, a resulting action outcome probability value from an at least one selectable action outcome probability value associated with the selected action and the selected node;

determine, based upon:

i) the resulting action outcome probability value, ii) the selected action, and iii) the selected node, a resulting observation and a resulting reward;

send an outgoing result message to the search agent device, the outgoing result message including the resulting observation and the resulting reward; and update the potential action outcome probability values based upon:

the selected action, the selected node, the resulting observation, the resulting reward, or a combination thereof; and a quantification system, including:

an orchestrator device, further including:

an orchestrator device processor;

an orchestrator device communication interface, configured for data communication with the trainer device, coupled to the orchestrator device processor; and an orchestrator device memory, coupled to the orchestrator device processor of the orchestrator device, including orchestrator device programming;

a target device, further including:

a target device processor;

a target device communication interface, configured for data communication with the orchestrator device, coupled to the target device processor; and a target device memory, coupled to the target device processor of the target device, including target device programming and at least one target device security setting; and an aggressor device, further including:

an aggressor device processor;

an aggressor device communication interface, configured for data communication with the orchestrator device and the target device, coupled to the aggressor device processor; and an aggressor device memory, coupled to the aggressor device processor of the aggressor device, including aggressor device programming;

wherein:

one or more of:

i) the target device processor, ii) the target device communication interface, iii) the target device memory, iv) the target device programming, or v) a combination thereof, constitute a target device profile;

execution of the aggressor device programming by the aggressor device processor of the aggressor device configures the aggressor device to implement functions, including functions to:

perform an access action, the access action accessing the target device processor, target device communication interface, or target device memory in compliance with the at least one target device security setting;

execution of the target device programming by the target device processor of the target device configures the target device to implement functions, including functions to:

prevent access to the target device processor, target device communication interface, or target device memory by the aggressor device in compliance with the at least one target device security setting; and execution of the orchestrator device programming by the orchestrator device processor of the orchestrator device configures the orchestrator device to implement functions, including functions to:

measure success of the aggressor device in accessing the target device processor, target device communication interface, or target device memory, based upon the access action performed by the aggressor device, and the target device profile;

aggregate the measured success of the aggressor device to determine a measured success rate, based upon the success of the aggressor device, the access action, and the target device profile; and updating the potential action outcome probability values based upon:

the measured success rate, the access action, the target device profile, or a combination thereof.

* * * * *